United States Patent [19]
Ota et al.

[11] Patent Number: 5,835,659
[45] Date of Patent: Nov. 10, 1998

[54] OPTICAL FIBER-FIXING SUBSTRATE, METHOD OF PRODUCING THE SAME AND OPTICAL DEVICE

[75] Inventors: Takashi Ota, Kasugai; Masashi Fukuyama, Inuyama; Yukio Aisaka, Kasugai, all of Japan

[73] Assignee: NGK Insulators, Ltd., Japan

[21] Appl. No.: 601,108

[22] Filed: Feb. 16, 1996

[30] Foreign Application Priority Data

Feb. 21, 1995 [JP] Japan ................................ 7-055249
Feb. 9, 1996 [JP] Japan ................................ 8-046819

[51] Int. Cl.⁶ .................................................. G02B 6/36
[52] U.S. Cl. .............................. 385/137; 385/83; 385/49; 385/88; 385/89
[58] Field of Search .................. 385/137, 65, 83, 385/99, 49, 135, 88, 89

[56] References Cited

U.S. PATENT DOCUMENTS

| | | | |
|---|---|---|---|
| 3,864,018 | 2/1975 | Miller | 350/96 |
| 4,079,927 | 3/1978 | Rocton | 269/296 |
| 4,088,386 | 5/1978 | Hawk | 350/96.21 |
| 4,639,074 | 1/1987 | Murphy | 350/96.15 |
| 4,875,969 | 10/1989 | Hsu et al. | 156/633 |
| 5,018,817 | 5/1991 | Suzuki et al. | 350/96.17 |
| 5,247,598 | 9/1993 | Takimoto et al. | 385/99 |

FOREIGN PATENT DOCUMENTS

| | | | |
|---|---|---|---|
| 0331334 | 9/1989 | European Pat. Off. | G02B 6/38 |
| 0388642 | 9/1990 | European Pat. Off. | G02B 6/26 |
| 0403761 | 12/1990 | European Pat. Off. | G02B 6/38 |
| 0573288 | 12/1993 | European Pat. Off. | G02B 6/38 |
| 55-45051 | 3/1980 | Japan | G02B 7/26 |
| 57-58112 | 4/1982 | Japan | G02B 7/26 |
| 61-61111 | 3/1986 | Japan | G02B 6/40 |
| 63-278004 | 11/1988 | Japan | G02B 6/24 |
| 2-125209 | 5/1990 | Japan | G02B 6/30 |
| 2-187709 | 7/1990 | Japan | 385/65 |
| 7-77633 | 3/1995 | Japan | G02B 6/42 |
| 2191601 | 12/1987 | United Kingdom | G02B 6/36 |

*Primary Examiner*—John Ngo
*Attorney, Agent, or Firm*—Parkhurst & Wendel

[57] ABSTRACT

The present invention aims to prevent formation of defect or break-off at ridges of fixing grooves of optical fiber-fixing substrates, when an optical fiber is received in the fixing groove or when an end surface of the substrate is polished by a grinding work. For that purpose, the ridges of the fixing grooves of the substrate have a curvature of radius of not less than 5 $\mu$m over the entire portion of the ridges viewed in the lateral cross-sectional view of the fixing grooves. Preferably, the bottoms of the fixing grooves of the substrate have a curvature of radius of not more than 5 $\mu$m viewed in the lateral cross-sectional view of the fixing groove. The fixing grooves may be produced by press forming.

12 Claims, 16 Drawing Sheets

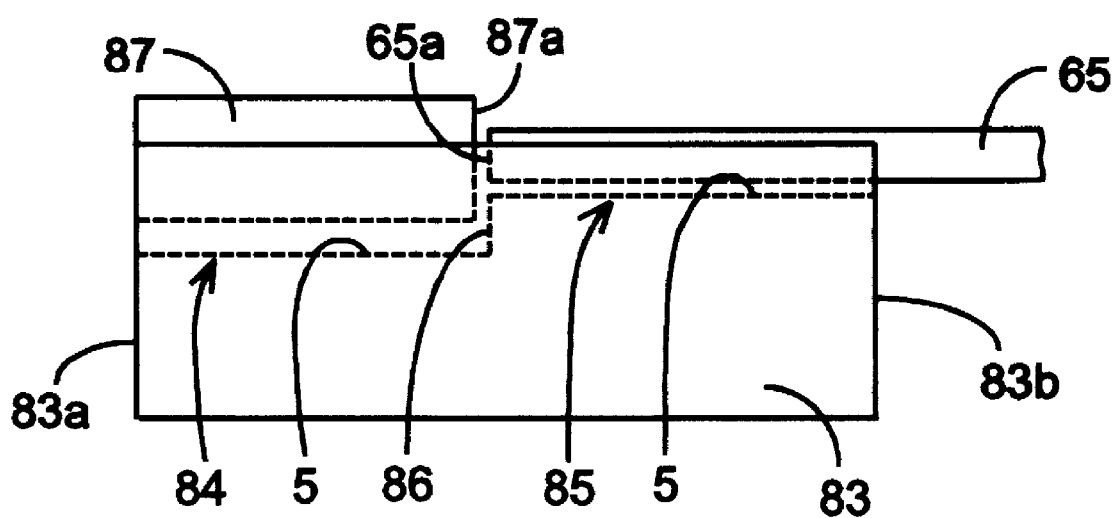

OPTICAL FIBER-FIXING SUBSTRATE, METHOD OF PRODUCING THE SAME AND OPTICAL DEVICE

BACKGROUND OF THE INVENTION

1. Field of the Invention

The present invention relates to an optical fiber-fixing substrate having a fixing groove for receiving and fixing an optical fiber therein, and a method of producing the same.

2. Description of Related Art

Various substrates are known for fixing an optical fiber having a diameter of, for example, around 125 μm. In any type of substrate, a light beam transmission loss between the optical fiber and another light beam trans-mitting means becomes large, if the axis of the optical fiber is displaced from a desired position. Thus, working of a very high precision of the fixing groove, such as not over than 0.5 μm, is required for fixing the optical fiber. FIG. 1(a) is a perspective view of an example of such a substrate, wherein a main body 2 of a substrate 34 for fixing an optical fiber is made of a glass or ceramics. A plural number of so-called V grooves 12 extend in the upper surface of the substrate main body 2 from an end towards the opposing end of the upper surface. The grooves 12 are formed parallel to each other. In the V groove 12, an inclined surface 7 extends substantially linearly between the ridge 43 and the bottom 11. Thus, the V grooves 12 have a V shaped cross-section. The respective V groove 12 is minute having a depth of around a hundred and several tens μm, for example.

In producing such a substrate for fixing an optical fiber, the V grooves may be formed by a method of etching a silicon material. However, the method has a limit in the working precision and could hardly produce the V grooves of a high precision of more than a certain extent. Thus, in order to accomplish such a high precision, a method of forming the V grooves has been used wherein, alumina, agate, zirconia or the like ceramics is worked by grinding. In such a case, the V grooves are formed by, for example, sintering a shaped ceramic body to prepare a sintered body, plane grinding the sintered body to prepare a flat surface, and then grinding the flat surface by a diamond grinding wheel. At that time, when the grinding is effected by a diamond grinding wheel, the grinding is effected in a constant direction, so that each V groove 12 extends respectively linearly and parallel to each other from an end towards the opposing end of the flat surface of the main body 2, as shown in FIG. 1(a).

The substrate 34 having the optical fibers 9 received and fixed in the respective V groove 12 has to be optically coupled to other light beam transmitting devices. Namely, if an optical fiber is used as another light beam transmitting device, a separate optical fiber is prepared, the end surface of the optical fiber fixed in the V groove 12 is contacted with the end surface of the separate optical fiber, and the contacted portions of the optical fibers are heated and melted to connect the optical fibers. Thereafter, the connected optical fibers are removed from the respective fixing groove.

As an alternative example, if an optical guide wave is used as another light beam transmitting device, an optical waveguide substrate having provided an optical waveguide is prepared. Each optical fiber 9 is fixed in the respective V groove 12, and an adhesive agent layer 8 is formed around the optical fibers 9 to firmly join each optical fiber 9 to the main body 2 of the substrate 34. A lid 32 is joined onto the substrate 34 to prepare an assembly as shown in FIG. 1(b). Thereafter, the end surface 33 of the substrate 34 is polished by grinding and the end surface of the optical waveguide is polished by grinding to a high precision, the polished end surfaces of the two substrates are joined to each other, and the other end surface of the respective optical waveguide is optically coupled to the end surface of the corresponding respective optical fiber.

The substrate 34 is applicable also to a core wire selecting device as described in I. Nakanishi et al "Study of an Optical Fiber Movable Type Core Wire Selecting Device" reported in Electro Information Communication Society, Communication Society General Meeting B-651, 1995. In this case, an optical fiber is fixed until the middle of the V groove, and the end surface of the optical fiber is optically polished. A master optical fiber is received in the V groove to oppose the optically polished end surface of the already fixed optical fiber. In such a state, light beams can be passed and guided from the master optical fiber to the respective optical fiber. By this means, experiments can be performed, such as, detection of trouble of the optical core wire.

The inventors have found out the following problem in the process of studying the form of such an optical fiber-fixing substrate. Namely, when the respective optical fiber 9 is received in the respective V groove 12 of the substrate 34 as shown in FIG. 1(a) and the surface of the substrate 34 is carefully observed by a survey type electron microscope, a minute defect or fragmented portion 30 is found sometimes at a portion of the top 10 of the ridge 43 or a portion 10A of the flat surface as exaggeratedly shown in FIG. 1(a). Such a defect 30 is likely formed when the optical fibers 9 is received in the respective V groove 12. Formation of the defect 30 may have an adverse influence over the optical fiber 9, so that the substrate 34 having the defect 30 has to be discarded as a rejected part resulting in the increase in production costs.

Particularly, in case when the optical fiber is coupled to an optical waveguide, the end surface 33 of the substrate 34 of the assembly shown in FIG. 1(b) has to be polished by grinding as described above. However, subsequent study of the polished surface revealed sometimes a minute defect 31 at the edge of the ridge 10 or 10A. Such a defect also should not be formed, because a situation is considered that the precision of the coupled portion of the end surface of the optical waveguide and the end surface of the substrate 34 is decreased by the fragment 35 produced by the defect when coupling the both end surface to each other, or a situation is considered that deterioration of the substrate 34 proceeds from the defect 30 when the coupled article of the optical waveguide and the substrate 34 is used in a strict environmental condition for a long period of time.

In addition, in the aforedescribed optical fiber movable type core wire selecting device, the master optical fiber is inserted in the inlet or opening of the respective V groove and moved in the respective V groove towards the respective optical fiber. However, the respective master optical fiber is likely damaged when the respective master optical fiber is collided against the respective ridge at the neighborhood of the opening of the V groove. Such a damage of the master optical fiber is a problem because the inspection of the trouble of the optical core wires can not be performed.

SUMMARY OF THE INVENTION

An object of the present invention is to prevent the formation of the defect or break-off in the ridge of the fixing groove of the optical fiber-fixing substrate when an optical fiber is received in the fixing groove of the substrate or when the end surface of the substrate is polished by grinding.

Another object of the present invention is also to minimize defects, the broken fragments or the like damage of the optical fiber.

In the first aspect, the present invention is an optical fiber-fixing substrate, comprising a fixing groove for receiving, positioning and fixing an optical fiber therein, the entire ridges of the fixing groove having a curvature of radius of at least 5 µm viewed in the lateral cross-sectional view of the fixing groove.

The inventors have conducted extensive research to solve the above problems and observed the form of the ridge of the fixing groove by a survey type electron microscope. As a result, the inventors have found that the ridge has a sharp top and the defect is easily formed at or around the sharp top thereby forming the defect or fragment.

The inventors have also studied the reason why the ridge or its neighborhood has such a sharp top to determine that it necessarily results from the method of forming the groove, which has heretofore been overlooked. This point will be described later with reference to the drawings.

Based on these findings, the inventors found out a finding leading to the present invention that the above described phenomena of the defect or the formation of minute fragment can be prevented by imparting a radius of curvature of not less than 5 µm viewed in a lateral cross-section of the fixing groove to the entire portion of the ridges of the fixing groove.

Preferably, the bottom of the fixing groove has a radius of curvature not more than 5 µm viewed in the lateral cross-section of the fixing groove. Namely, a sharp bottom is preferable. This is because, if the bottom has too large of a curvature and the size of the optical fiber is relatively small with respect to the size of the fixing groove, the optical fiber can easily contact a dust or the like debris in the bottom if such debris is present therein. As a result, the optical axis of the optical fiber is displaced from a desired position to increase an insertion loss between another light beam transmitting means.

In the first aspect of the present invention, preferably the optical fiber-fixing substrate is made of a glass or ceramic, and the fixing groove of the substrate is preferably formed by a press forming method. The reason therefor will be explained later.

BRIEF DESCRIPTION OF THE DRAWINGS

For a better understanding of the present invention, reference is made to the attached drawings in which:

FIG. 11(b) is a side view of the substrate 40 of FIG. 11a;

FIG. 14 is a side view of an optical device of an embodiment of the fourth aspect of the present invention;

Figure 1A:
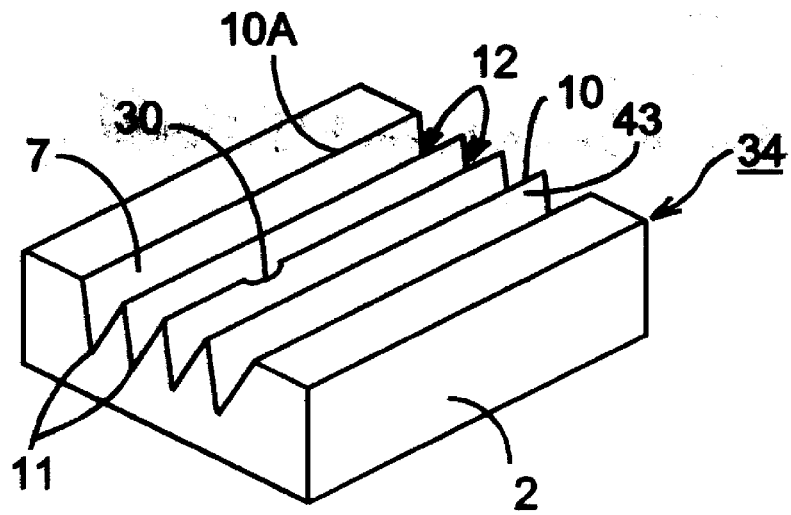
FIG. 1(a) is a perspective view of a conventional optical fiber-fixing substrate 34.
Figure 1B:
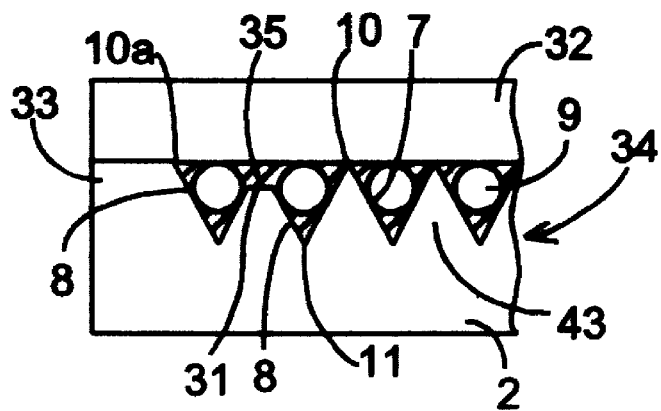
FIG. 1(b) is a front view of an assembly obtained by joining a lid 32 onto the substrate 34 of FIG. 1(a)

NUMBERING IN THE DRAWINGS 1, 8, 12, 22, 24, 34, 40, 45, 49, 51: optical fiber-fixing substrate; 2: main body of substrate; 3, 3A, 3B, 12, 13, 17, 23, 50, 52, 58A, 58B, 60: fixing groove; 5: sharp bottom; 7: inclined surface; 8: adhesive agent; 9, 9A, 59A, 59B, 59C: optical fiber; 10, 10A: sharp ridge; 11, 18: round bottom; 14: flat bottom; 44, 44A, 46: ridge having a radius of curvature of at least 5 μm over the entire ridge; 47: flat surface of the ridge 46; 48: edge between the flat surface 47 and the inclined surface of the ridge 46; 55, 56: coating of the optical fiber; 63, 70, 73: optical guide wave; 65a: vertical end surface of the optical fiber; and 65b: inclined end surface of the optical fiber.

DETAILED EXPLANATION OF THE INVENTION

Hereinafter, the present invention will be explained in more detail with reference to the drawings, if necessary.

Figure 2A:
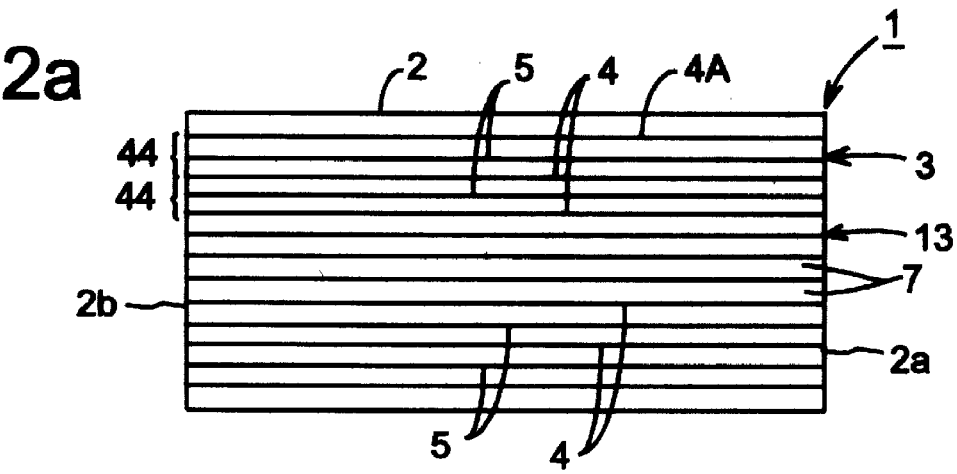
FIG. 2(a) is a plan view of an optical fiber-fixing substrate of an embodiment of the first aspect of the present invention.
Figure 2B:
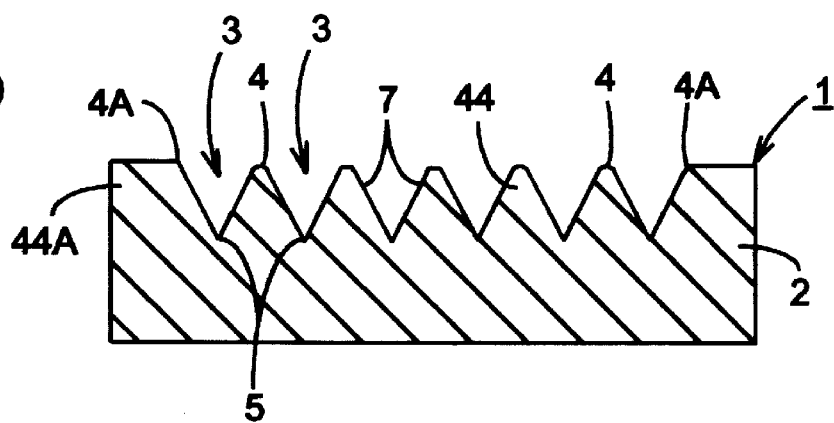
FIG. 2(b) is a cross-sectional view of the substrate 1 of FIG. 2(a)
Figure 2C:
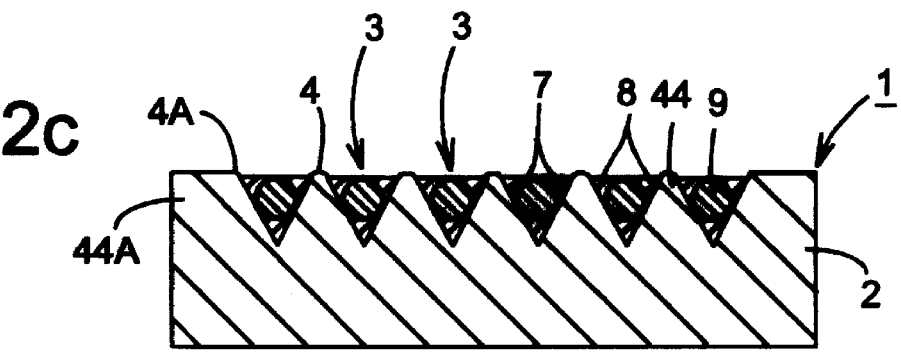
FIG. 2(c) is a cross-sectional view of an assembly obtained by receiving the optical fibers 9 in the respective fixing groove 3 of the substrate 1.

FIG. 2(a) is a plan view of an optical fiber-fixing substrate 1 of an embodiment of the present invention, FIG. 2(b) is a cross-sectional view of the substrate 1, FIG. 2(c) is a cross-sectional view of the substrate 1 wherein the optical fibers 9 are received and joined in the respective fixing-groove 3. The substrate 1 has a desired number of rows (for example, 6 rows in FIG. 2) of the fixing groove 3 formed in the main body 2. Each fixing groove 3 extends from an end surface 2a of the main body 2 to the other end surface 2b of the main body 2. As the shape of the fixing groove 3; though a so-called "V" groove is used in this embodiment, a "U" groove is also usable in the present invention.

Each V groove 3 has a pair of opposing inclined surfaces 7 and a sharp bottom 5 is formed between the opposing inclined surfaces 7. In the cross-sectional view shown in FIG. 2(b), the bottom 5 is formed to have a radius of curvature of not more than 5 μm. The bottom 5 can hardly be processed to a radius of curvature of less than 1 μm, so that a radius of curvature of not less than 1 μm is preferable from the aspect of processing.

Between the fixing grooves 3 are respectively formed ridges 44. At the outer sides of the two outermost fixing grooves 3, are respectively formed sides forming ridges 44A. Each ridge 44, 44A is formed in a cross-sectional view to have a radius of curvature of at least 5 μm in a cross-sectional view over the entire portion of the ridge. Namely, each ridge is minutely round. Here, in this embodiment, the tops 4, 4A of the ridges 44, 44A should have a radius of curvature of not less than 5 μm in a cross-sectional view, because those portions of the ridges 44, 44A other than the tops 4, 4A are linear in cross-section and thus have an infinite radius of curvature.

After receiving the optical fibers 9 in the respective fixing groove 3 shown in FIG. 2(b), the end surfaces of the optical fibers 9 are disposed to oppose the end surfaces of preliminarily prepared optical fibers, and both the end surfaces of the opposing optical fibers are melted to join to each other. Alternatively, the optical fibers 9 are received in the respective fixing groove 3 and contacted with the inclined surfaces 7 to decide their position, and then an adhesive agent is introduced and filled in the interstices between the optical fibers 9 and the fixing grooves 3 to form an adhesive agent layer 8 thereby to fix the optical fibers 9, as shown in FIG. 2(c). Thereafter, the end surfaces of the optical fibers 9 are optically coupled to an optical waveguide. It is of course possible to insert and receive the master optical fiber in the fixing groove 3 as described above.

By providing a minute round portion at the tops 4, 4A of the ridges 44, 44A as shown in FIG. 2, the problem of the minute defect in the ridges 44 and sides 44A could be solved. However, for achieving such a function and an effect, the ridges should have a radius of curvature of not less than 5 μm over the entire portion of the ridges.

However, regarding the tops of the ridges, an excessively large radius of curvature of the tops may result in a situation that the inclined surfaces 7 of the fixing groove 3 will exceed a contacting point to the optical fibers 9, so that the optical fibers 9 are not positioned in the fixing grooves 3. When arranging standard optical fibers of a diameter of 125 μm in a pitch of 250 μm, a theoretically allowable radius of curvature is 90 μm at the maximum. However, from a practical viewpoint of considering an error, the ridges 4 and sides 4A preferably have a radius of curvature of not over than 80 μm.

Figure 3:
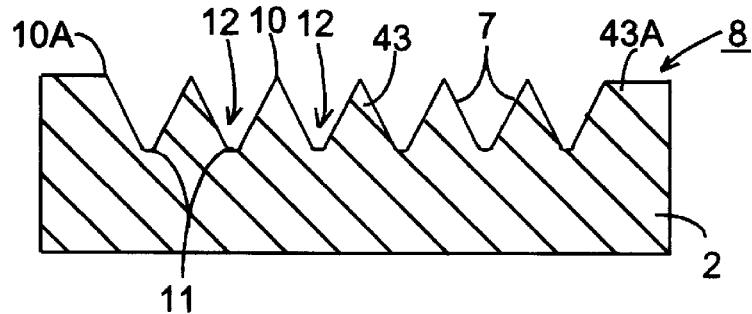
FIG. 3 is a cross-sectional view showing the lateral cross-section of a conventional optical fiber-fixing substrate 8.

The inventors have studied the microscopic form of conventional optical fiber-fixing substrates as described above, and the form is schematically shown in FIG. 3 wherein the respective V groove 12 has a pair of opposing inclined surfaces 7 and a round bottom 11 between the opposing inclined surfaces 7. Between the fixing grooves 3 is respectively formed a ridge 43. At the outer sides of the two outermost fixing grooves 12 is respectively formed a ridge 43A.

Here, the inventors observed the shapes of the ridges 43 and sides 43A and the bottoms 11 by a survey type electron microscope to find that the ridges 43 and sides 43A are very sharp and the tops 10, 10A of the ridges have a radius of curvature of around 1 μm in a cross-sectional view. In contrast, the bottoms 11 are minutely round in shape and have a radius of curvature of around 10 μm in a cross-sectional view. The inventors made studies on the reason of producing such a form.

In a conventional method, the surface of the main body 2 of the substrate was worked by a diamond grinding wheel to form the fixing grooves. In such a case, it is considered that the root portion of the grinding wheel could perform a relatively sharp grinding to give sharp ridges 10, 10A, meanwhile, the edge of the grinding wheel could hardly perform a sharp grinding of the bottoms 11, so that the round bottoms 11 are formed.

The inventors formed also the V grooves by etching a silicon wafer. However, the inventors have found that sharp edges are formed at the ridges also in this case.

In contrast, the inventors have found out that the substrate having the ridges and the bottoms of the form as shown in FIG. 2 can be mass-produced by the following production method. That is, at first a mold having a desired planar shape, for example, as shown in FIG. 2(a), is prepared. Of course, the planar shape of the fixing groove in the optical fiber-fixing substrate may be varied by changing the planar design of the mold.

Figure 4:
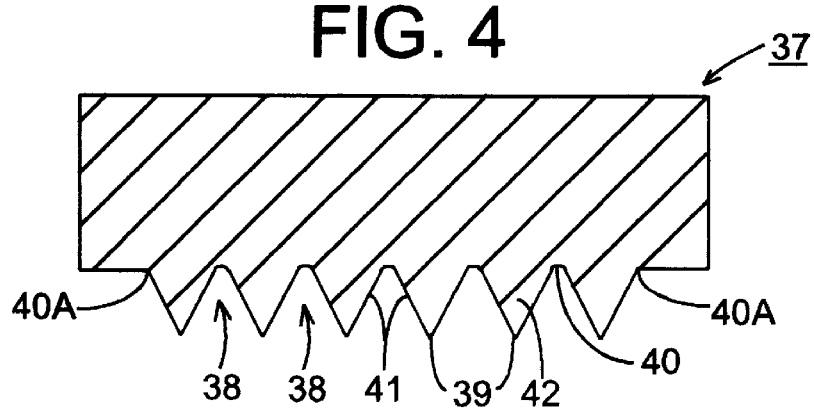
FIG. 4 is a cross-sectional view of a mold 37 for producing the substrate 1 of FIG. 2.

At that time, the mold 37 is provided with grooves 38 and projections 42 respectively corresponding to the shapes of the ridges 4, 4A and the fixing grooves 3 as shown in FIG. 4. The mold 37 is used in combination with the other base mold for press forming a glass or ceramic therebetween to produce the substrate 1 shown in FIG. 2. At the time of press forming, the shape of the grooves 38 is transferred to the ridges 4, 4A of the substrate 1, the shape of the projections 42 is transferred to the V grooves 3 of the substrate 1, and the shape of the inclined surfaces 41 is transferred to the inclined surfaces 7 of the substrate 1.

Here, the grooves 38 of the mold 37 should also be formed by grinding. However, by the grinding operation also, the projections 39 become sharp and the bottoms 40, 40A assume a round shape. If such a mold is used for preparing a shaped body, the resultant shaped body has the sharp bottoms 5 transferred from the sharp projections 39 of the mold, and the round ridges 4, 4A transferred from the round bottoms 40, 40A of the mold, as shown in FIG. 2(b).

Thereafter, if the resultant shaped body is made of a ceramic powder, the shaped body is degreased, the degreased shaped body is fired to obtain an optical fiber-fixing substrate. If the resultant shaped body is made of a glass, the shaped body is annealed to obtain an optical fiber-fixing substrate. Alternatively, the shaped body is heat treated to crystallize the glass, and the shaped body made of the crystallized glasses is annealed to obtain an optical fiber-fixing substrate.

Alternatively, the sharp ridges 43 shown in FIG. 3 is worked by grinding to give the edges a curvature of radius of not less than 5 μm over the entirety of the ridges.

Figure 5:
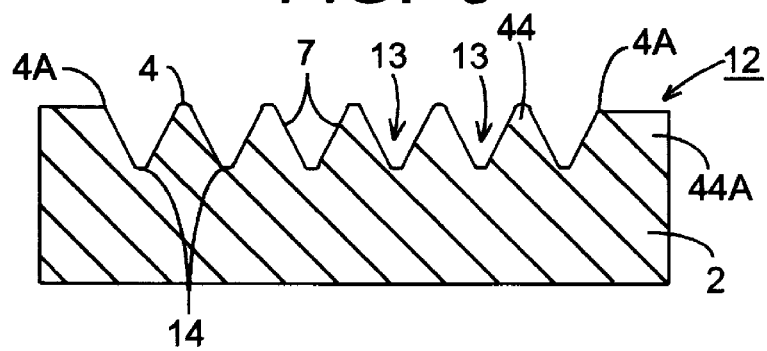
FIG. 5 is a cross-sectional view of an optical fiber-fixing substrate 12 of another embodiment of the first aspect of the present invention.

The fixing grooves 13 of the substrate 12 may also have a flat surface at the bottoms 14, as shown in FIG. 5.

Figure 6:
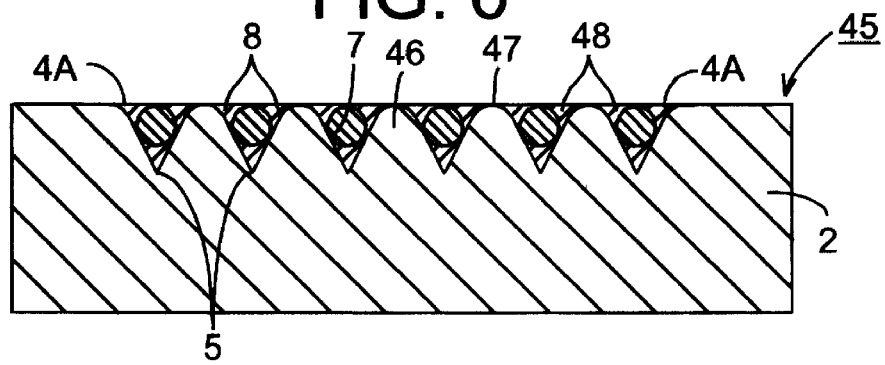
FIG. 6 is a cross-sectional view of an optical fiber-fixing substrate 45 of a still another embodiment of the first aspect of the present invention.

An optical fiber-fixing substrate 45 of a form as shown in FIG. 6 may also be produced. The bottoms 5 of the substrate 45 have a radius of curvature of not more than 5 μm. The bottoms 5 are formed between the inclined surfaces 7 of the ridges 46, and hold the respective optical fiber therein by means of an adhesive agent layer 8. The tops of the ridges 46 have respec-tively a flat surface 47, and edges 48 are formed between the ends of the flat surface 47 and the upper ends of the inclined surfaces 7. The edges 48 have respec-tively a radius of curvature of not less than 5 μm.

It is also conceivable to provide a curvature or round portion at the above described bottoms. However, in the present invention, preferably the grooves have sharper bottoms, and concretely the bottoms have a preferable radius of curvature of not more than 5 μm. The reason thereof will be explained below with reference to FIG. 7.

Figure 7A:
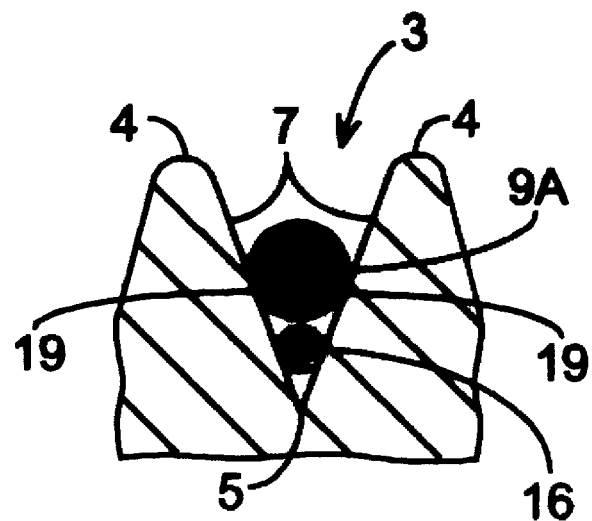
FIG. 7(a) is a cross-sectional view of an assembly wherein an optical fiber 9A and a dust particle 16 is received in the fixing groove 3 having a sharp bottom 5.

FIG. 7(a) shows a sharp bottom 5 in the fixing groove 3. If the optical fiber 9A is relatively small with respect to the size of the fixing groove 3 and held at a desired position by contacting with the inclined surfaces 7, there still remains an interstice below the optical fiber 9A. Reference numeral 19 denotes a pair of the contacting positions between the optical fiber 9A and the inclined surfaces 7. Thus, if a minute dust particle or fragment is dropped in the fixing groove 3, the minute dust particle or fragment invades the interstice below the optical fiber 9A, but does not contact the optical fiber 9A.

Figure 7B:
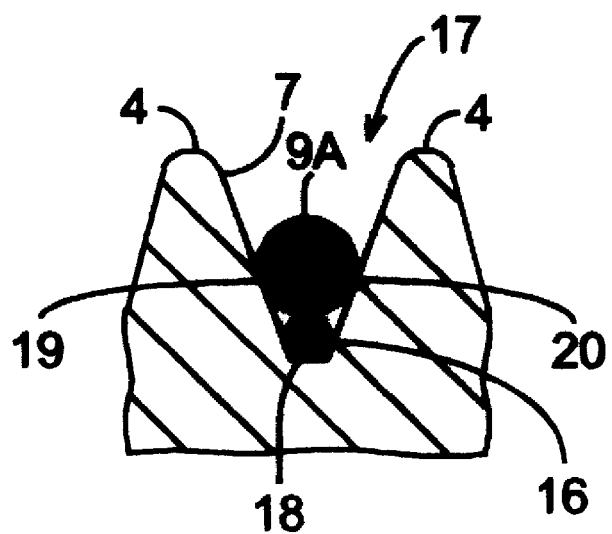
FIG. 7(b) is a cross-sectional view of an assembly wherein the optical fiber 9A and a dust particle 16 is received in a fixing groove 17 having a round bottom 18.

FIG. 7(b) shows a round bottom 18 in the fixing groove 17. If the optical fiber 9A is held at a desired position by contacting with the inclined surfaces 7, the interstice below the optical fiber 9A has a small gap from the bottom. Thus, if a minute dust particle or fragment 16 is dropped in the fixing groove 17, it invades the interstice below the optical fiber 9A and easily contacts the optical fiber 9A. As a result, the optical fiber 9A contacts insufficiently with an inclined surface 7 and is likely elevated at the position 20.

When the substrate is formed by the press forming method as described above, the planar shape of the fixing grooves can freely be changed, unlike the case of forming the fixing grooves by the grinding operation. For example, curved fixing grooves or bent fixing grooves viewed in plan view, which heretofore have been difficult to prepare, can be prepared. Substrates produced by such preparation methods will be explained below in sequence.

In the second aspect, the present invention provides an optical fiber-fixing substrate, comprising a fixing groove for receiving, positioning and fixing an optical fiber therein, the fixing groove having a curved portion viewed in plan view, the substrate being made of a glass or ceramic and produced by press forming.

Figure 8A:
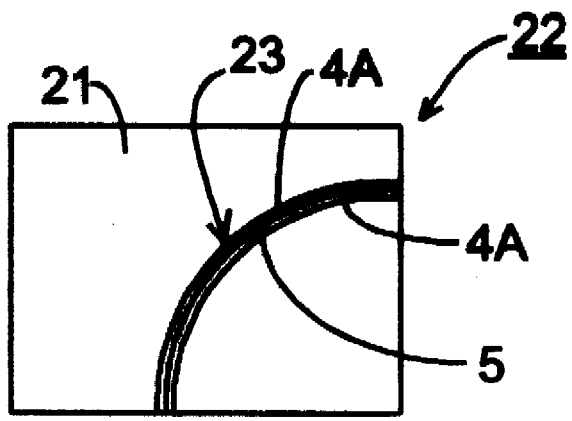
FIG. 8(a) is a plan view of an optical fiber-fixing substrate 22 having a fixing groove 23 of the second invention.
Figure 8B:
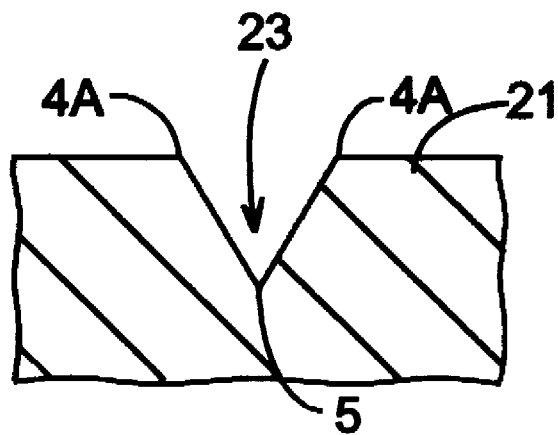
FIG. 8(b) is an enlarged cross-sectional view of and around the fixing groove 23.

Here, the substrate may include one or at least two curved portions. FIG. 8(a) is a plan view of an optical fiber-fixing substrate 22 of an embodiment of the second aspect of the present invention, and FIG. 8(b) is a cross-sectional view of an example of the fixing groove. On the main body 21 of the substrate is formed an arcuate fixing groove 23. The ridge 4A and the bottom 5 have the same forms as those of FIG. 2. According to such a substrate, an optical fiber may correctly be positioned by receiving the optical fiber in the V groove.

Figure 9A:
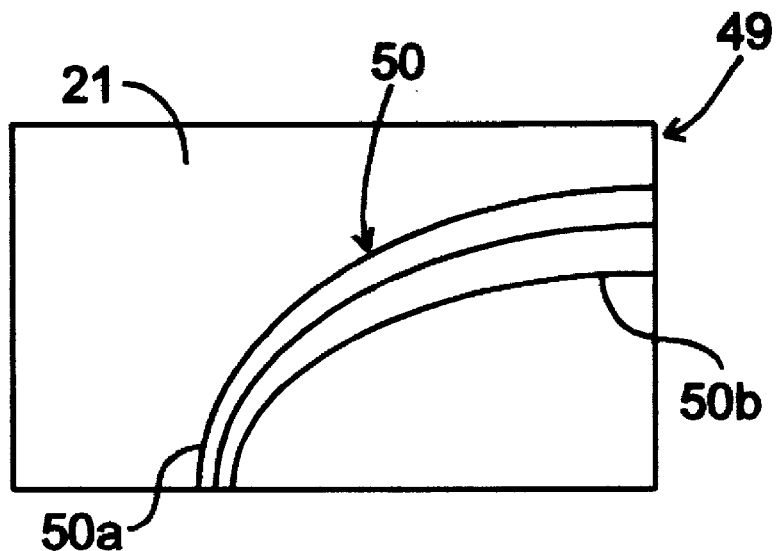
FIGS. 9(a) and 9(b) are schematic plan views of the fixing grooves respectively showing a planar shape thereof prepared by a different method.

The inventors tried to produce the substrate having the fixing groove of such a planar shape by a publicly known method, but could not produce a substrate which can suffi-ciently correctly position an optical fiber by such a known method. For instance, when forming a fixing groove 50 which is curved at a right angle from an edge 50a to another edge 50b in the main body 21 of the substrate 49 by a grinding method as shown in FIG. 9(a), the grinding wheel has to be moved in a lateral direction and the width of the fixing groove 50 is increased during the moving process, so that the fixing groove 50 has a larger width at the edge 50b than at the edge 50a. As a result, the optical fiber can not be fixed at a desired position.

Figure 9B:
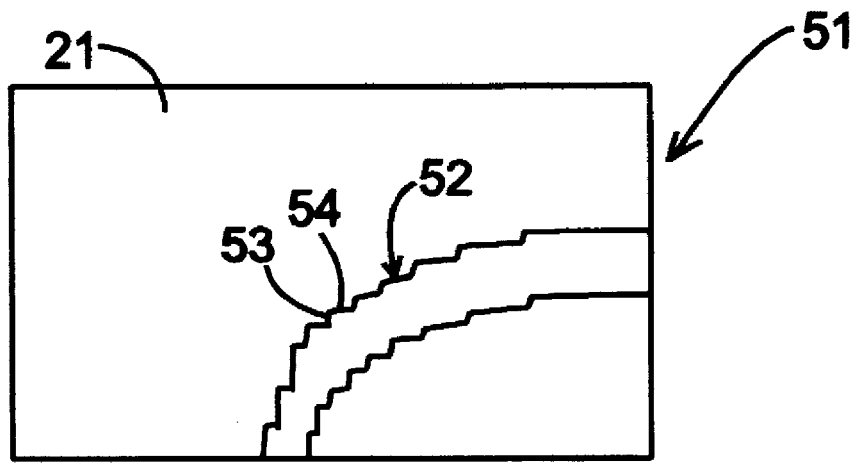

Meanwhile, when the substrate is produced by etching of a silicon substrate, the silicon substrate 21 has an anisotropic property of crystal orientation in a plane between the x direction and the y direction as shown in FIG. 9(b), so that steps 53, 54 are formed during the gradual change of the direction of the fixing groove 52. As a result, the optical fiber in the fixing groove 52 is hardly positioned at a desired position resulting in a poor reliability.

In contrast, when the substrate is produced by a press forming method, a mold having a desired planar form can easily be prepared by electrical discharge machining.

In the second aspect of the present invention, the forms of the ridges and the bottoms of the fixing grooves are not limited to those shown in FIGS. 2–6.

In the second aspect of the present invention, an optical fiber having the same planar shape may be received and fixed in the fixing groove in a stress free state from the inclined surfaces of the fixing groove. For that purpose, an optical fiber is preliminarily separately prepared having substantially the same planar shape with that of the fixing groove, and received in the fixing groove.

In another embodiment, the second aspect of the present invention provides an optical device which is a coupling device for coupling the respective optical fiber of a first optical fiber group to the respective optical fiber of a second optical fiber group when the spacing of the respective optical fiber of the first group is different from the spacing of the respective optical fiber of the second group, comprising an optical fiber-fixing substrate having the above described curved portion, the substrate having fixing grooves respec-tively formed corresponding to the optical fibers among the first group and the optical fibers among the second group, one end of the respective fixing groove being formed at a position corresponding to the respective optical fiber of the first group, the other end of the respective fixing groove being formed at a position corresponding to the respective optical fiber of the second group, the optical fibers among the first group and the optical fibers among the second group being received and fixed in the fixing grooves, and the optical fibers among the first group and the optical fibers among the second group being connected to allow commu-nication of light beams therethrough in either direction.

The above embodiment is applicable to a coupling device for coupling a respective optical waveguide and a respective optical fiber belonging to optical fiber groups, when the spacing of the respective optical fiber in an optical fiber group consisting of a plural number of optical fibers is different from the spacing of the respective optical waveguide in an optical waveguide substrate having a plural number of optical waveguides.

Figure 10A:
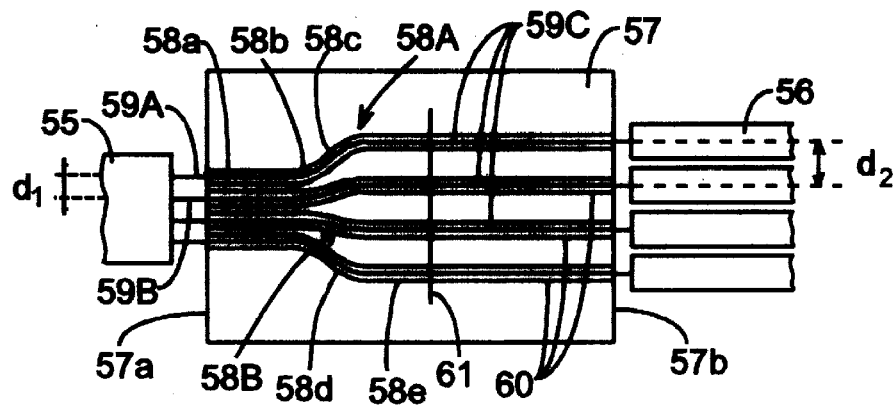
FIGS. 10(a) and 10(b) are plan views of optical devices respectively showing another embodiment of the second aspect of the present invention.
Figure 10B:
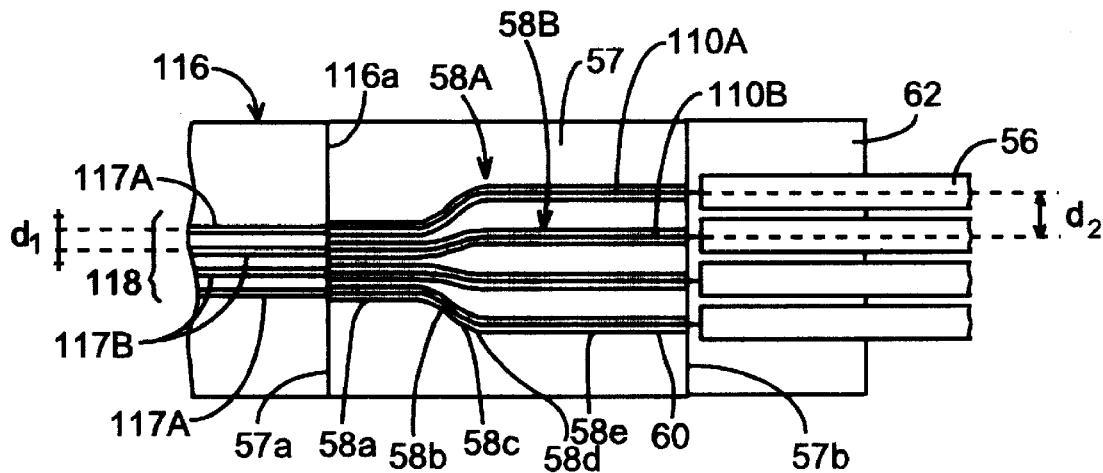
Figure 10C:
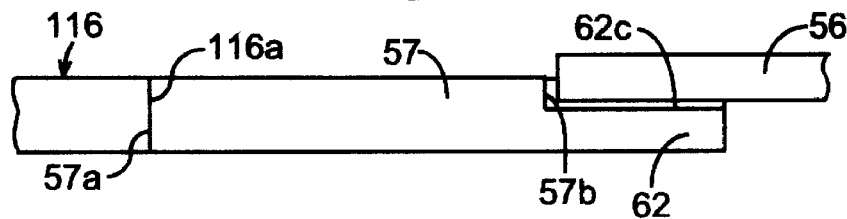
FIG. 10(c) is a side view of the optical device of FIG. 10(b)

FIG. 10(a) is a plan view of an optical device showing an example of this embodiment, FIG. 10(b) is a plan view of an optical device showing another example of this embodiment, and FIG. 10(c) is a side view of the optical device shown in FIG. 10(b). In FIG. 10(a), the optical fibers 59A, 59B of the first optical fiber group are positioned to oppose the left end surface 57a of the substrate 57 and accommodated in a single coating 55 and the spacing $d_1$ of the optical fibers 59A, 59B is relatively small. In contrast, the optical fibers 59c of the second optical fiber group are positioned to oppose the right end surface 57b of the substrate 57 and accommodated in a respective coating 56 and the spacing $d_2$ of the respective optical fiber 59C is relatively large. In the left portion of the substrate 57 are formed two rows of the fixing grooves 58A and two rows of the fixing grooves 58B. In the right portion of the substrate 57 are formed fixing grooves 60. The fixing grooves 58A, 58B and the fixing grooves 60 are continuously formed, respectively. The fixing grooves 58A, 58B have respectively a straight portion 58a, an outwardly curved portion 58b, a short straight portion 58c, an inwardly curved portion 58d, and a straight portion 58e, and the straight portion 58e is continuously formed with the fixing groove 60 at the connecting line.

In the curved portion 58A are accommodated outward optical fibers 59A, while in the curved portion 59B are accommodated inward optical fibers 59C. The respective optical fibers 59A, 59B and the respective optical fiber 59C are coupled to each other. The coupling is effected preferably by the mechanical splice method which is described in NTT Study Feasibility Report Vol. 33, No. 3, (1984), p. 588 etc.

In the fixing substrate shown in FIGS. 10(b) and 10(c), the substrate 57 and the optical fiber-holding substrate 62 are integrally formed thereby to further proceed the integration of the optical coupling device. In the upper surface of the substrate 62 are formed grooves 62c for receiving the respective coating 56 of the respective optical fiber. The left end surface 57a of the substrate 57 is joined to an end surface 116a of an optical waveguide substrate 116 which has plural rows of optical waveguides 117A, 117B formed thereon. In this embodiment, the spacing of the optical wavwguides is $d_1$. The respective optical fibers 110A, 110B are respectively accommodated in the coating 56 and the spacing $d_2$ thereof is larger than $d_1$.

In the fixing grooves 58A, 60 are accommodated the outward optical fibers 110A, while, in the fixing grooves 58B, 60 are accommodated the inner optical fibers 110B. The respective optical fibers 110A, 110B are fixed in the fixing grooves by means of an adhesive agent, the end surface 57a of the fixing substrate 57 is optically polished and the polished end surface 57a is optically coupled to the respective optical waveguide. At the time, the outward optical fiber 110A is optically coupled to a corresponding optical waveguide 117A, and the inward optical fiber 110B is optically coupled to a corresponding optical waveguide 117B. In the drawings, the reference numeral 118 denotes a group of optical waveguides.

In FIGS. 10(a), 10(b), in order to receive the respective optical fiber in a curved fixing groove, preferably a straight optical fiber is sequentially bent and received in a curved fixing groove along the inclined surfaces of the fixing groove. In such a case, the fixing grooves 58A, 58B are smoothly curved, so that stresses are not concentrated in a portion of the optical fiber in the fixing groove, to prevent breakage of the optical fiber.

In the embodiment shown in FIGS. 10(a) and 10(b), the coating 56 of the optical fiber may usually have a diameter of 0.9 nm. In such a case, the spacing of the fixing grooves 60 is 0.9 mm. The spacing of the tape fibers 59A, 59B or the spacing of the optical waveguide is 0.25 mm, for example, so that the spacing of the fixing grooves 58a is set to 0.25 mm.

In the third aspect, the present invention is an optical fiber-fixing substrate formed by a press forming method, comprising a fixing groove for receiving and positioning an optical fiber, at least one end portion of the fixing groove being formed in the substrate viewed in plan view, and the end portion having a vertical end surface formed relative to the main surface of the substrate.

Figure 11A:
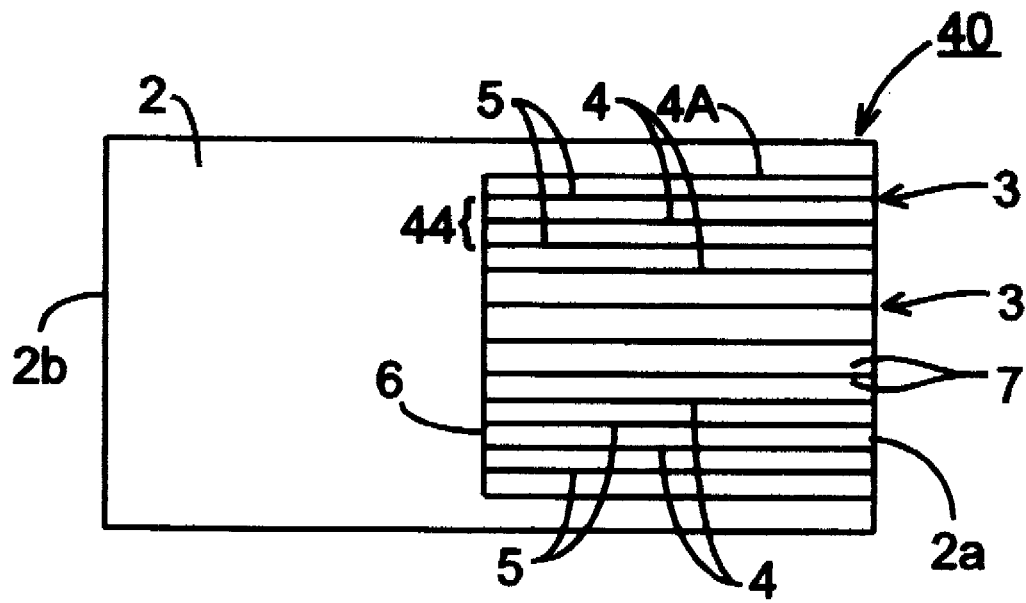
FIG. 11(a) is a plan view of an optical fiber-fixing substrate 40 of an embodiment of the third aspect of the present invention.
Figure 11B:
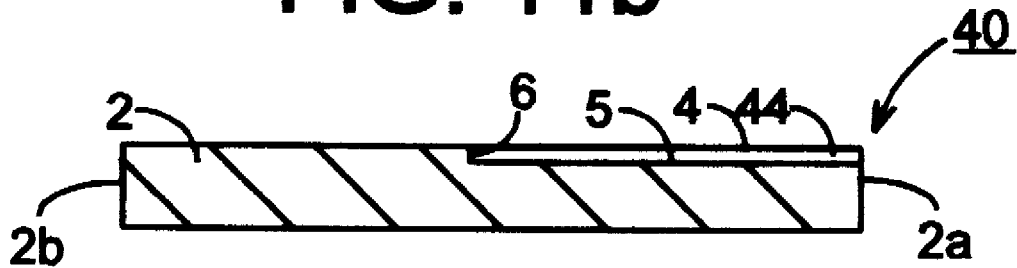

FIG. 11(a) is a plan view of an optical fiber-fixing substrate 40 showing an embodiment of the present invention, and FIG. 11(b) is a side view thereof. The ridges 44, 44A, the tops 4, 4A and the bottom 5 of the fixing grooves 3 are the same as those of FIG. 2. However, though the fixing grooves 3 are formed substan-tially parallel to each other to extend from one end surface 2a to a direction of the other end surface 2b, the fixing grooves 3 are terminated at substantially the central portion of the main body 2 of the substrate 40.

Figure 12A:
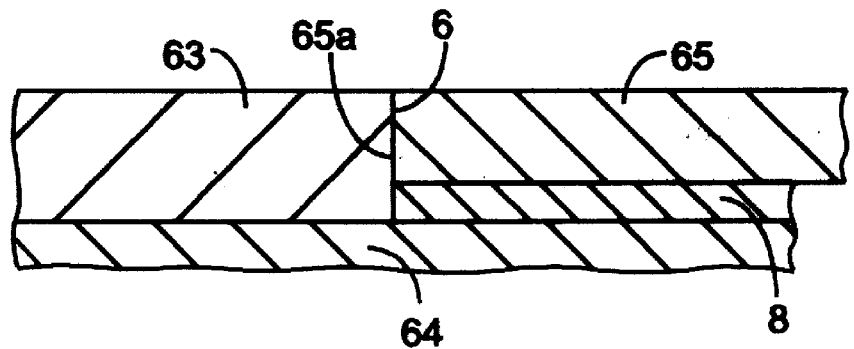
FIGS. 12(a), 12(b) and 12(c) are enlarged cross-sectional views of and around the connected portion of an end surface of an optical waveguide and an end surface of a fixing groove prepared respectively by a different method.
Figure 12B:
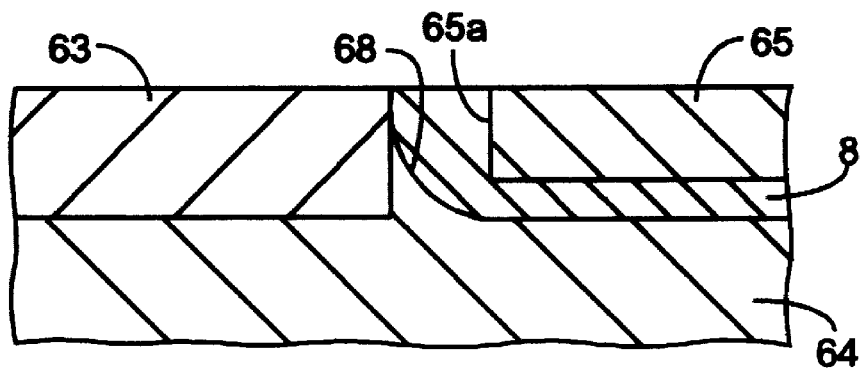

The end surface 6 of the fixing groove 3 in the substrate is substantially a vertical flat surface relative to the main surface of the substrate 40, as shown in FIG. 12(a). If the fixing grooves were formed by the above described press forming method, the angle between the end surface 6 and the main surface of the substrate could be made to 90+0.2 degree. As a result, if the end surface 65a of the optical fiber 65 is made as a vertical surface, the end surface 65a of the optical fiber 65 can be contacted and positioned to the end surface 6.

In the present invention, an optical waveguide 63 can be formed continuously particularly to the end surface 6 of the fixing groove. By such an arrangement, the optical fiber 65 can automatically optically be coupled to the optical waveguide 63, if the end surface 65a of the optical fiber 65 is contacted with the end surface 6 by positioning the geometrical center of the optical fiber received in the fixing groove and the core of the optical waveguide 63 in x, y directions. For example, such an optical guidewave can be prepared by forming the substrate 64 from an ion exchanged glass and forming the optical waveguide 63 by an ion exchange method.

In case if the fixing groove was formed by a grinding method, the end surface 68 of the fixing groove assumes a curved shape, as shown in FIG. 12(a), which in a cross-sectional view has a radius of curvature of usually 20 mm or more depending on the diameter of the grinding wheel. Therefore, the above described contacting and positioning of the end surface of the optical fiber to the end surface of the fixing groove can not be performed.

Figure 12C:
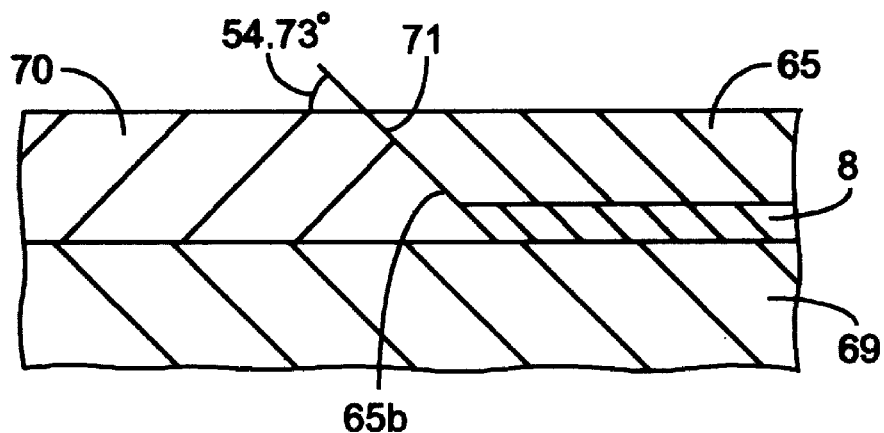

In case if the fixing groove was formed by etching of a silicon substrate, an inclined surface 71 is formed at the end surface of the fixing groove as shown in FIG. 12(c). This is because the etching of the silicon substrate 69 is performed by an anisotropic etching. Usually, the inclined surface 71 is formed having an angle of 54.73 relative to the main surface of the substrate. As a result, a gap is necessarily formed between the end surface 65a of the substrate 65 and the end surface 71 of the fixing groove. In order to remove the gap, the end surface 65b of the substrate 65 has to be provided with the same inclination angle as described above, and the inclined surface 65b and the end surface 71 have to be intimately contacted to each other without a gap therebetween, as shown in FIG. 12(c). By this arrangement, the optical fiber 65 and the optical guide wave 70 can be contacted to each other without an intervening gap.

However, if such an optical connecting method is adopted, the direction of the rotation around the central axis of the optical fiber must be exactly adjusted between the end surface 65b of the optical fiber 65 and the end surface 71 of the fixing groove, in the case when the optical fiber is inserted in the fixing groove and optically connected to the optical waveguide. However, the positioning of such an optical fiber 65 which is rotatable by 360° in the direction of the rotation is a difficult operation and increases the production costs.

Figure 13A:
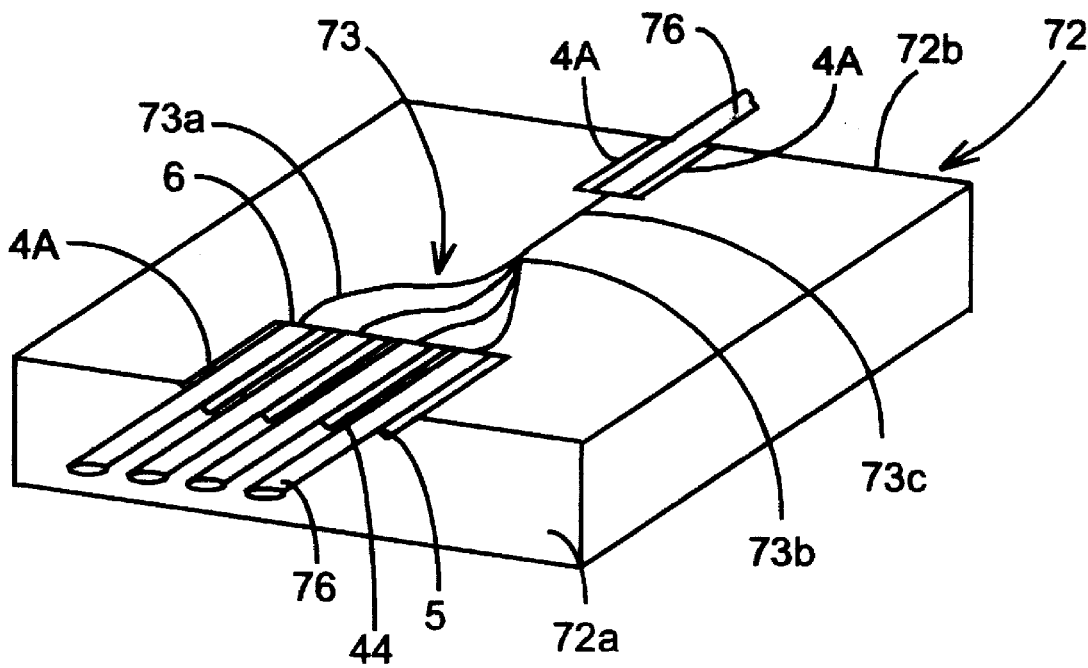
FIGS. 13(a) and 13(b) are perspective views of optical devices respectively showing another embodiment of the third aspect of the present invention.

In the optical device 72 shown in FIG. 13(a), four rows, for example, of the optical fibers 76 existing at an end surface 72a of the device 72 are received respectively in the above described groove, and the vertical end surfaces of the respective optical fiber 76 are contacted to the end surface 6 of the fixing groove which is vertical to the main surface of the substrate to fix their position. One row, for example, of the optical fibers 76 existing at the other end surface 72b of the device 72 is received in the above described groove, and the vertical end surface of the optical fiber 76 is contacted to the end surface 6 of the fixing groove which is vertical to the main surface of the substrate to decide its position. The end surfaces of the optical fibers 76 are optically connected to the branched portion 73a or the straight portion 73c of the optical waveguide 73 in the substrate, as shown in FIG. 13(a). The branched portion 73a and the straight portion 73c are united at the branching point 73b.

When forming an ion exchanged optical waveguide, usually a glass substrate is ion exchanged at the surface to prepare an optical waveguide of a depth of around 10 $\mu$m. Therefore, the center of the optical waveguide exists in a depth of around 5 $\mu$m from the surface. Hence, the size and the shape of the fixing groove are designed such that the center of the optical fiber received in the fixing groove is coincident with the center of the optical waveguide. By designing the fixing groove in such a fashion, the centering of the substrate in the depth direction can be mechanically realized.

When coupling the optical fiber and the optical waveguide in this way, the end surface of the fixing groove has to be polished to a mirror surface to permit efficient permeation of light beams therethrough. In the present invention, the end surface of the fixing groove can be polished to a mirror surface by polishing that surface of the press mold which corresponds to the end surface of the fixing groove to a mirror surface. Particularly preferably, an average surface roughness Ra of the end surface of the fixing groove can be made to a small value of 10 nm or less.

An optical waveguide can be formed in the surface of the glass substrate also by a flame deposition method.

In a further embodiment of the third aspect, the optical fibers in the fixing groove can be coupled to optical elements. According to this embodiment, the above described fixing groove can be formed at any portion viewed in plan view of the optical fiber-fixing substrate. Namely, an end surface of the fixing groove can be provided at a desired point of the substrate and the other end surface of the fixing groove can be provided at a position opposing the optical elements. By receiving and fixing the optical fibers in this fixing groove, the optical fibers can be optically coupled to the optical elements on the substrate without centering the optical fibers.

Figure 13B:
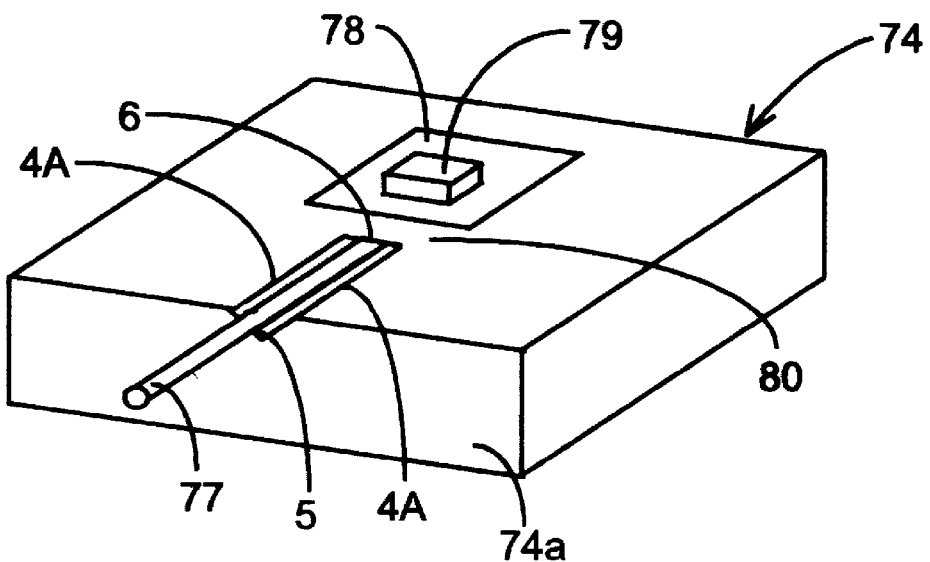

As such optical elements, luminescent elements and light receiving elements are particularly useful. FIG. 13(b) is a perspective view of an embodiment of such an optical device to which the present invention is applied. A fixing groove having the same shape as that shown in FIG. 2 is provided in an optical device 74 to face an end surface 74a of the optical device 74. An end surface of the optical fiber 77 received in the fixing groove is contacted to an end surface 6 of the fixing groove. A luminescent interface of a luminescent diode 79 is positioned at a position opposing the end surface 6. Between the luminescent interface of the luminescent diode 79 and the end surface of the optical fiber 77 (namely, an end surface of the fixing groove) is provided a desired gap portion 80, because the luminescent diode is likely deteriorated if the luminescent interface is directly contacted to the end surface of the optical fiber 77. The reference numeral 78 denotes an electrode for controlling the luminescent diode 79.

The luminescent diode emits light beams at a height of, for example, 10 $\mu$m viewed from the bottom of the luminescent diode (a surface of the substrate). Therefore, in such a case, the size and the shape of the fixing groove are designed such that the center of the optical fiber received in the fixing groove is coincident with the position of the luminescence of the luminescent diode.

The present invention is applicable to optical integrated elements, such as, described in SASAKI Masami et al "Hybrid Integrated Mounting of Semiconductor Laser Array Module using Si Substrate" reported in Communicationology Technical Report EDM94-29, CPM94-43, OPE94-38 (1994-08); "Hybrid-technique couples laser array to fibers" reported in LASER FOCUS WORLD May 1991 p217; and NTT Optoelectronics Research Center, YAMADA Yasufumi's report "Hybrid Optointegrating Technology using Quartz-series Planer Optical Wave Circuits" (The Third Photoelectronics Information Treatment Research Members Document).

In the present invention, the fixing groove in the substrate may be provided with at the both ends respectively the aforedescribed end surface 6 which is vertical to the main surface of the substrate. The assembly may be severed to produce a substrate which has a fixing groove opened at one end and which has the end surface 6 at the other end.

In the fourth aspect, the present invention provides an optical fiber-fixing substrate produced by a press forming method, comprising a fixing groove for receiving and positioning an optical fiber, the fixing groove having at least a first portion of a relatively large cross-sectional size and a second portion of a relatively small cross-sectional size, the first portion having an end surface which is formed vertical to the main surface of the substrate between the first and second portions. That is, as shown in FIG. 14, the optical fiber-fixing substrate 83 has the first portion 84 of a relatively large cross-sectional size at an end surface 83a and a second portion 85 of a relatively small cross-sectional size at the other end surface 83b. Between the first portion 84 and the second portion 85 is formed an end surface 86 of the first portion 84 so as to be vertical to the main surface of the substrate 83. In the first portion 84 is received and fixed a passive light beam transmitting member 87 of a relatively large diameter, and in the second portion 85 is received and fixed an optical fiber 65 of a relatively small diameter. An end surface 87*a* of the light beam transmitting member 87 in the first portion 84 is contacted to the end surface 86 of the first portion 84 thereby to decide its position. As a result, the end surface 65*a* of the optical fiber 65 is contacted to the end surface 87*a* of the light beam transmitting member 87 without a gap there-between. In this state, particularly the light beam transmitting member and the optical fiber can be coupled to each other preferably by a mechanical splicing method.

As the light beam transmitting member 87, particularly an optical fiber of a relatively large diameter, lenses (GRIN lens, ball lens, etc.) may be exemplified. Heretofore, for coupling such a passive type light beam transmitting member of a relatively large diameter and an optical fiber of a relatively small diameter, there was a method of fixing both in a respective array and then coupling the arrays. However, when coupling the array of the light beam transmitting member to the array of the optical fiber, the process of optically centering both the light beam transmitting member and the optical fiber was cumbersome and expensive.

In the fifth aspect, the present invention provides an optical device having an optical fiber-fixing substrate produced by a press forming method, comprising fixing grooves for receiving and positioning light beam transmitting members, a first protrusion having a first fixing groove formed therein, a second protrusion having a second fixing groove formed therein, and a coupling portion coupling the first protrusion and the second protrusion, the first fixing groove having a higher height viewed from the surface of the coupling portion than the height of the second fixing groove, and the light beam transmitting member received and fixed in the first fixing groove and the light beam transmitting member received and fixed in the second fixing groove being optically coupled to each other.

In an embodiment of the fifth aspect, if an optical element is fixed at the coupling portion, the height of an incident light beam in the optical element viewed from the surface of the coupling portion may be different from the height of an emitted light beam, and the light beam trans-mitting member received and fixed in the first fixing groove and the light beam transmitting member received and fixed in the second fixing groove may be optically coupled to each other through the optical element. As such an optical element, any optical element may be used having different heights of an incident light beam and an emitted light beam, and an optical isolator is particularly preferable.

Heretofore, such arrangements are known wherein optical fibers are disposed to oppose in V grooves of optical fiber-fixing substrates, and a wavelength filter or an optical isolator is disposed between the opposing substrates, as reported by "O plus E." January, 1991, p124–125, and CHUZENZI Tomihiro et al "Optical Fiber Integrated Type Biased Wave Non-dependent Isolator" Electron Information Communication Society, Autumn Meeting C-229 (1992). However, such arrangements still have large optical losses and insufficient isolation properties. Therefore, in a system adopted in commercially sold optical isolators, two collimators are oppposingly disposed and an optical isolator element is disposed between the opposing two collimators, as reported by NOUCHI Tomohiko et al "Compact All Resin-free Biased Wave Non-dependent Optical Isolator" Electron Information Communication Society, Autumn Meeting C-216 (1993), and HIRAI Shigeru et al "Properties of Biased Wave Surface Non-dependent Type Optical Isolator" Electron Information Communication Society, Autumn Meeting C-230 (1992). Collimators are usually used in FC connectors and are elements prepared by preliminarily incorporating lenses in an optical system assembled by incorporating optical fibers in ferrules.

However, in an optical isolator of such a system, when the positioning of the collimators is performed, the alignment of the two axes, namely, X axis and Y axis, has to be performed as well as the alignment in the rotational directions of θX and θY axes, and these alignments require much labor and time.

The present invention provides, in an optical element, particularly optical isolator, wherein the optical axis is changed due to a shift of the optical fiber in the interior, a method of directly collimating optical axes by optical fibers held in an optical fiber-fixing substrate. By this method, the conventional cumbersome problem of adjusting the X axis, Y axis, θX axis and θY axis is not necessary and can be dispensed with.

Figure 15A:
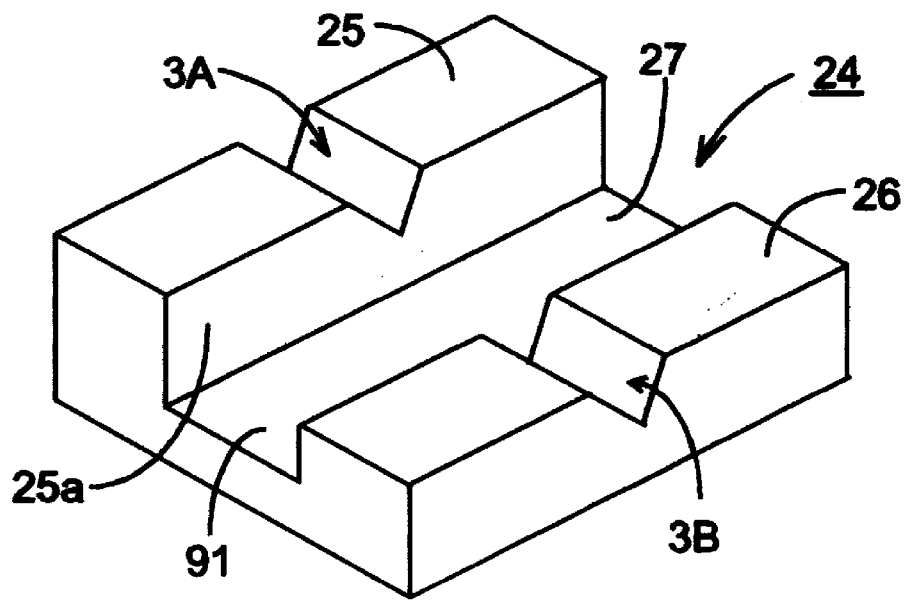
FIG. 15(a) is a perspective view of an optical fiber-fixing substrate 24 of the fifth aspect of the present invention.
Figure 15B:
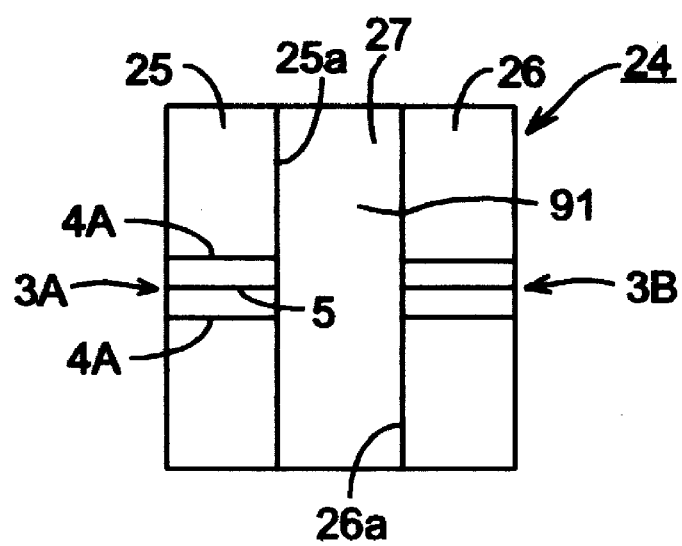
FIG. 15(b) is a plan view of the substrate 24.

FIG. 15(*a*) is a perspective view of an optical fiber-fixing substrate 24 which is used in an embodiment of the present invention and FIG. 15(*b*) is a plan view of the optical fiber-fixing substrate 24. The substrate 24 is provided with a first protrusion 25 positioned at a relatively higher level, a second protrusion 26 positioned at a relatively lower level viewed from the surface of a coupling portion 27 than the first protrusion 25, and a coupling portion 27 connecting the first protrusion 25 and the second protrusion 26. The protrusions 25, 26 have respectively a first fixing groove 3A and a second fixing groove 3B. The shape per se of the fixing grooves is the same as the shape of those shown in FIG. 2. However, the present invention is not solely limited to the substrate of such a shape of the fixing grooves and is applicable also to the optical fiber-fixing substrate having another shape of the fixing grooves. Both the fixing groove 3A in the first protrusion 25 and the fixing groove 3B in the second protrusion 26 extend straightly, and the fixing grooves 3A and 3B extend along the same line when viewed in plan view.

According to the press forming method, the protrusions 25, 26 positioned at different levels of height and the coupling portion 27 can simultaneously be formed in a single pressing process. Such a processing can hardly be effected by a grinding process or an etching process.

Figure 16A:
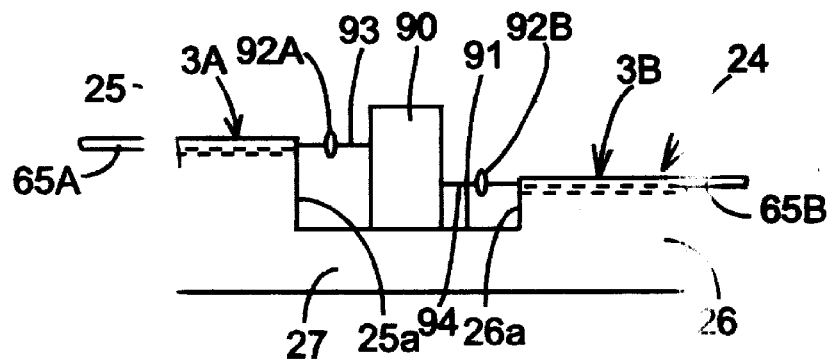
FIG. 16(a) is a schematic cross-sectional view of the substrate 24 of FIG. 15 wherein an optical isolator is arranged thereon.
Figure 16B:
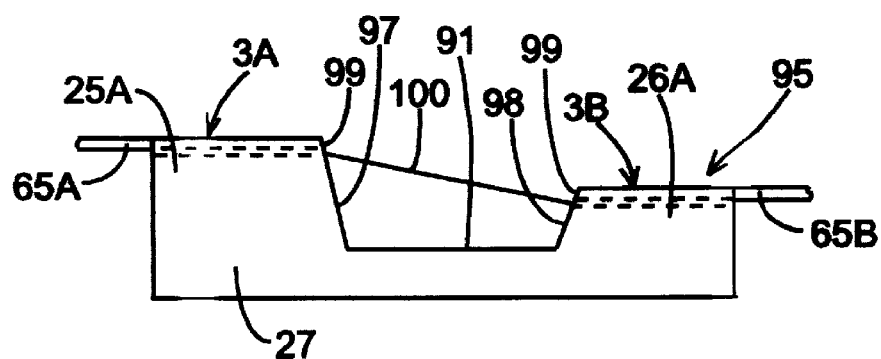
FIG. 16(b) is a schematic side view of an optical device wherein an end surface of the optical fiber is inclined to the vertical surface in the substrate 24.
Figure 16C:
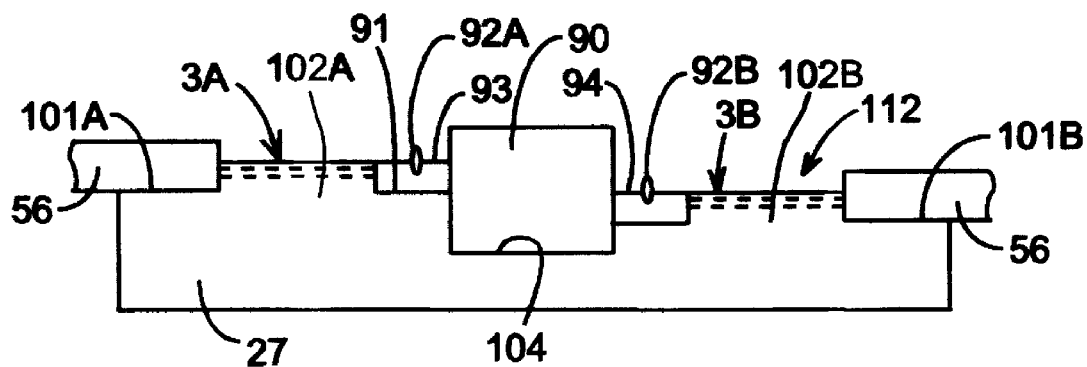
FIG. 16(c) is a schematic cross-sectional view of an another substrate of the present invention wherein an optical isolator is arranged thereon.

In the fixing grooves 3A and 3B in the first and second protrusions are respectively received and positioned an optical fiber. At that time, if an optical element, such as a birefringent plate or an optical isolator having different heights of an incident light beam and an emitted light beam, is arranged on the coupling portion 27, the optical axis of the optical fiber in the fixing grooves 3A and that of the optical fiber in the fixing grooves 3B not coincident but displaced from each other. The distance or the step difference between the optical axes of the fixing grooves 3A and 3B is adjusted, considering the displacement. In case when the optical fiber has an inclined end surface, the optical axes of the respective optical fiber are similarly displaced between the fixing grooves 3A and 3B, so that the distance or the step difference between the optical axes of the fixing grooves 3A and 3B is adjusted. As illustrated in FIG. 16(*a*), an optical fiber 65A is received and fixed in the fixing groove 3A of the first protrusion 25, and an optical fiber 65B is received and fixed in the fixing groove 3B of the second protrusion 26 to perform the positioning. An optical isolator 90 is disposed on the surface 91 of the coupling portion 27 between the end surface 25*a* of the first protrusion 25 and the end surface 26*a* of the first protrusion 26, and lenses 92A, 92B are disposed on the both sides of the optical isolator 90. At this state, though the optical axes 93 and 94 at the both sides of the optical isolator 90 are displaced with respect to each other, the step difference between the optical axes 93 and 94 is adjusted by adjusting the step difference between the fixing grooves 3A and 3B.

Also when the optical fiber has an inclined end surface, the optical axis of the optical fiber in the fixing groove 3A has a displacement from that of the optical fiber in the fixing groove 3B in the same manner as described above. For example, as illustrated in FIG. 16(*b*), an optical fiber-fixing substrate 95 is provided with a first protrusion 25A positioned at a rela-tively higher level, a second protrusion 26A positioned at a relatively lower level viewed from the surface of a coupling portion 27 than the first protru-sion 25A, and a coupling portion 27 connecting the first protrusion 25A and the second protrusion 26A. The pro-trusion 25A has an inclined surface 97 relative to the vertical surface at the inner side facing the coupling portion, and the protrusion 26 also has an inclined surface 98 relative to the vertical surface at the inner side facing the coupling portion. Simultaneously, the optical fibers 65A, 65B have inclined end surfaces 99 relative to the vertical surface. The inclination of the end surfaces 99 of the respective optical fibers 65A, 65B is to prevent reabsorption of the reflected light beam into the optical fibers. Both the fixing groove 3A in the first protrusion 25A and the fixing groove 3B in the second protrusion 26A extend straightly, and the fixing grooves 3A and 3B extend along the same line when viewed in plan view.

In the fixing grooves 3A and 3B are respectively received, fixed and positioned optical fibers 65A and 65B. At this state, though the optical axis 100 connecting the optical fiber 65A in the fixing groove 3A and the optical fiber 65B in the fixing grooves 3B has an inclination to the horizontal surface, the emitted light beam emitted from the end surface of the optical fiber 65A can be adjusted to be incident with the optical fiber 65B by adjusting the step difference between the fixing grooves 3A and 3B.

In addition, the above described optical device can be afforded with a function to hold the coating of the optical fibers. By affording such a function, attachment of the optical fibers to the optical device can further be facilitated. Also, by disposing an optical element in the receiving hole at the surface of the coupling portion to allow the positioning of the optical element, a relative position of the optical element to the respective optical fiber, particularly, a distance between the optical element and the optical fiber, and the angle of the optical element, can easily and correctly be decided.

For example, in the optical device as shown in FIG. 16(*c*), a substrate 112 is provided with a first protrusion 102A positioned at a relatively high level, a second protrusion 102B positioned at a relatively low level viewed from the surface of a coupling portion 27 than the first protrusion 102A, and a coupling portion 27 connecting the first pro-trusion 102A and the second protrusion 102B. The protrusions 102A and 102B have respectively a first fixing groove 3A and a second fixing groove 3B formed therein. An optical element 90 is inserted and fixed in a receiving hole 104 formed in the coupling portion 27. By adjusting the depth and the plan position of the receiving hole 104, the optical fiber in the fixing groove 3A and the optical fiber in the fixing groove 3B can be optically coupled automatically.

The coating 56 of the optical fiber is received and fixed in a V groove 101A for positioning arranged at an end portion of the first protrusion 102A. The coat-ing 56 of the optical fiber is received and fixed in a V groove 101B for positioning arranged at an end portion of the second protrusion 102B.

The aforedescribed displacement of the optical axes, namely, the displacement between the optical axis of the optical fiber held in the first protrusion and the optical axis of the optical fiber held in the second protrusion is not particularly limited, however, it is usually around 50–150 μm.

Figure 17:
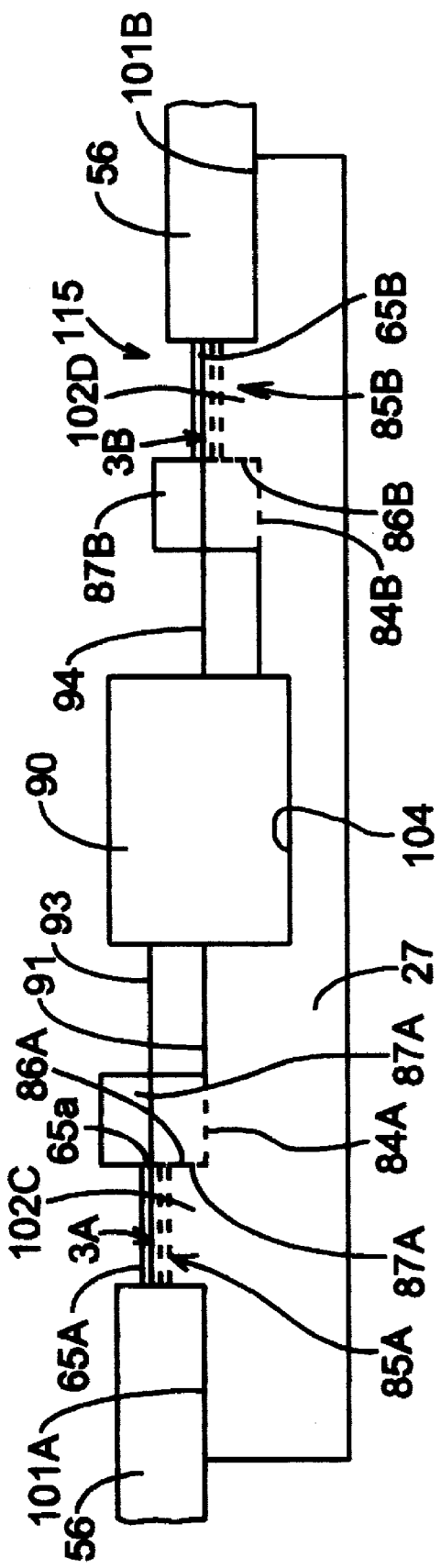
FIG. 17 is a schematic side view of an optical device using an optical fiber-fixing substrate of an embodiment of the fifth aspect of the present invention.

In the optical device shown in FIG. 17, the substrate 115 is provided with a first protrusion 102C positioned at a relatively high level, a second protrusion 102D positioned at a relatively low level viewed from the surface of a coupling portion 27 than the first protrusion 102C, and a coupling portion 27 connecting the first protrusion 102C and the second protrusion 102D.

The protrusions 102C and 102D have respectively a first portion 84A, 84B having the fixing groove of a relatively large cross-sectional size and a second portion 85A, 85B having the fixing groove of a relatively small cross-sectional size.

End surfaces 86A, 86B of the first portions 84A, 84B have respectively an inclined surface relative to the main surface of the substrate 115 between the first portions 84A, 84B and the second portions 85A, 85B. In the first portions 84A, 84B are received and fixed passive light beam transmitting members 87A, 87B of relatively large diameters. In the second portions 85A, 85B are received and fixed the optical fibers 65A, 65B of relatively small diameters. End surfaces 87*a* of the light beam transmitting members 87A, 87B are contacted with the end surfaces 86A, 86B and positioned thereby. As a result, the end surfaces 65*a* of the optical fibers 65A, 65B are contacted with the end surface 87*a* of the light beam transmitting members 87A, 87B without a gap therebetween.

As the light beam transmitting members 87A, 87B, may be particularly exemplified lenses (GRIN lens, ball lens, etc.), optical fibers of relatively large diameters.

In the V groove 101A for positioning arranged at the end of the first protrusion 102C is received and fixed the coating 56 of the optical fiber. In the V groove 101B for positioning arranged at the end of the second protrusion 102D is received and fixed the coating 56 of another optical fiber.

In the embodiment shown in FIG. 17, the diameter of the cross-section of the fixing grooves 85A, 85B for fixing the optical fibers is 0.125 mm, for example, and the diameter of the cross-section of the fixing grooves 84A, 84B for fixing the lenses is 1 mm, for example.

Figure 18A:
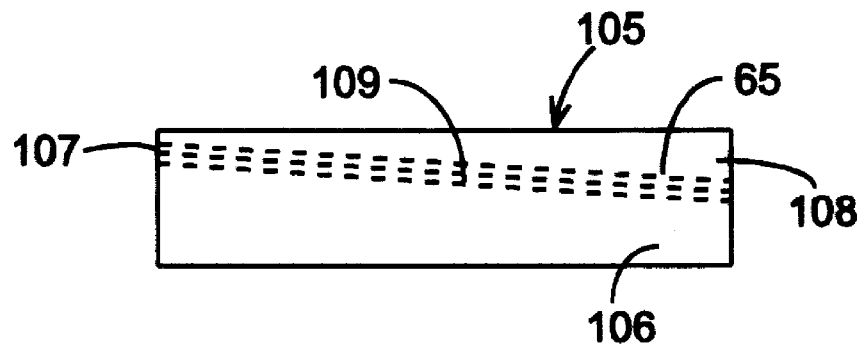
FIG. 18(a) is a schematic side view of an optical fiber-fixing substrate 105 of another aspect of the present invention.
Figure 18B:
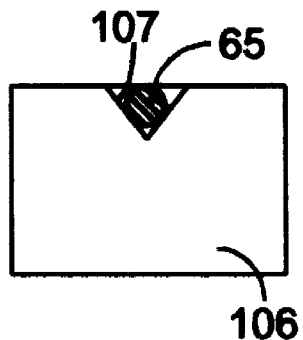
FIG. 18(b) is a front view of the substrate 105 of FIG. 18(a) viewed from an end surface side thereof.
Figure 18C:
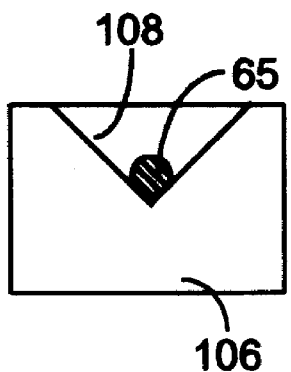
FIG. 18(c) is a front view of the substrate 105 of FIG. 18(a) viewed from the other end surface side thereof.

FIG. 18 is a side view of an optical fiber-fixing substrate 105, FIG. 18(*b*) is a front view of the substrate 105 viewed from an end side thereof, and FIG. 18(*c*) is a front view of the substrate 105 viewed form the other end side opposing the FIG. 18(*b*).

In a pair of the end surfaces of the substrate 106 are formed optical fiber-fixing grooves 109. The grooves 109 are V grooves in this embodiment. The size of the cross-section of the fixing grooves 109 is small at the end 107 and large at the end 108 and gradually increases from the end 107 towards the end 108 between the two ends. The optical fibers 65 are received and fixed along the bottom of the fixing grooves 109.

Next, the present invention relates to the material constituting the optical fiber-fixing substrate.

The inventors have found, in the process of producing the optical fiber-fixing substrates of various shapes by using the press forming method, that the optical fiber-fixing substrates of a very high precision, particularly a precision of 1.0 μm or less, can be obtained if the following material is used.

Namely, in the sixth aspect of the present invention, a material is preferably used having an average particle diameter of crystal grains constituting the glass ceramics of 1.0 μm or less, the main crystal layer composed of lithium disilicate ($Li_2O.2SiO_2$) phase and β-spodumene ($Li_2O.Al_2O3.4SiO_2$) or β-spodumene solid solution phase, and the crystal phase of $SiO_2$ composition of not more than 2 wt %.

Here, the expression "a crystal phase of $SiO_2$ composition" includes quartz, crystoballite and crystals of other structures. However, hereinafter in the present specification, among "a crystal phase of $SiO_2$ composition" those crystal phases having crystal structures other than quartz and crystoballite will be called by an abbreviated name of "$SiO_2$ crystal phase".

The inventors at first studied various glass ceramics and, as a result, succeeded in almost eliminating the $Li_2O$—$SiO_2$ phase and the crystal phase of $SiO_2$ composition to convert them to $Li_2O.2SiO_2$ phase and β-spodumene ($Li_2O.Al_2O_3.4SiO_2$) or β-spodumene solid solution phase, by limiting the material proportion ratio and crystallizing the material under the later described temperature condition. The glass ceramics has the main crystal phase consisting of lithium disilicate phase and β-spodumen or β-spodumen solid solution phase, and the crystal phase of $SiO_2$ composition of not more than 2 wt %. By using such a glass ceramic, the above described defect of the optical fiber-fixing substrates can effectively be prevented. Particularly, the connector described in Japanese Patent Application No. 4-17,752 having a function of detaching has the problem of the defect, etc., if it is made of a usual glass ceramic, so that the optical fiber-fixing substrate made of the aforedescribed specific glass ceramic is particularly preferable for such a connector. Also, the optical fiber-fixing substrate of a very high precision could be produced by the press forming method.

The composition and the production method of the glass ceramic will be explained further. Regarding the glass ceramic, the crystal phase of $SiO_2$ composition has to be not more than 2 wt % and the proportional ratio of the lithium disilicate phase to β-spodumene or β-spodumene solid solution phase is later described.

Concretely explaining, when producing the optical fiber-fixing substrate, a raw glass of a composition of 65–85 wt % of $SiO_2$, 8–15 wt % of $Li_2O$, 5–8 wt % of $Al_2O_3$ and 1–5 wt % of $P_2O_5$, preferably a composition of 75–80 wt % of $SiO_2$, 9–14 wt % of $Li_2O$, 5–8 wt % of $Al_2O_3$ and 1–3 wt % of $P_2O_5$, is heated at a heating temperature of 820–950 C. to prepare the glass ceramic.

$Al_2O_3$ is a necessary component for forming the β-spodumene or β-spodumene solid solution phase and also necessary for improving the stability of the crystal phase of the glass ceramics. If it if less than 5 wt %, β-spodumene is not formed in the crystal phase and the amount of the crystal phase of $SiO_2$ composition exceeds 2 wt %.

$SiO_2$ is an indispensable fundamental component for obtaining the crystal phases of lithium disilicate phase, etc. If it is less than 65 wt %, the desired crystal phases can hardly be precipitated, while if it exceeds 85 wt %, the melting of the glass ceramics becomes difficult.

As a result of the heat treatment of the afore-described raw glass, the inventors have found that a temperature of 820–950 C. has to be adopted for the crystallization of the glass. Namely, heretofore, crystallization of $Li_2O$—$SiO_2$—$Al_2O_3$ series glass at a temperature in a broad range of 700°–950° C. has been known. However, in the present invention, by crystallizing the raw glass of the above composition, 30–60 wt % of lithium disilicate phase, 1–25 wt % of β-spodumene and β-spodumene solid solution phase, the proportion of the phases being not less than 1.0, should preferably be prepared. For preparing the substrate made of a glass ceramics of such a specific composition, a crystallization temperature of 820°–950° C. has to be adopted for the raw glass.

In addition, the inventors have found that, in order to obtain the highest strength of the glass ceramics, a crystallization temperature of 820°–920° C. is preferable, and a crystallization temperature of 820°–900° C. is more preferable.

Explaining further, when heat treating the raw glass, if the heat treating temperature or crystalliza-tion temperature is around 700°–750° C., the $Li_2O.SiO_2$ phase and the $Li_2O.2SiO_2$ phase are formed in an amount of 30–50% and a some amount of the crystal phase of $SiO_2$ composition is formed. At that time, with the increase of the treat-ing temperature the $Li_2O.SiO_2$ phase and the $Li_2O.2SiO_2$ phase are increased simultaneously. At this stage, the substrate is weak in strength and can not be used.

If the heat treating temperature is increased to a temperature of around 800° C., the $Li_2O.SiO_2$ phase rapidly disappears and $Li_2O.2SiO_2$ phase and the crystal phase of $SiO_2$ composition rapidly increase.

However, if the heat treating temperature is increased to a temperature of 820° C., the crystal phase of $SiO_2$ composition is disappears, while the $Li_2O.2SiO_2$ phase increases. Also, it was found out that the β-spodumene phase rapidly increases simultaneously. This means that, at this region of temperature, the crystallization of the $Al_2O_3$ component progressed for the first time to form the β-spodumene phase ($Li_2O.Al_2O_3.4SiO_2$) or β-spodumene solid solution. At the stage before the formation of $Li_2O.Al_2O_3.4SiO_2$ composition, the proportion of $Li_2O$, $Al_2O_3$ and $SiO_2$ in the crystal phase does not exactly reach to the proportion of the $Li_2.Al_2O_3.4SiO_2$ composition, though it has a similar crystal structure, so that it is called "β-spodumene solid solution".

In the heat treating temperature range of 820°–920° C., the lithium disilicate phase and β-spodumene or β-spodumene solid solution phase are gradually increased with the increase of the treating temperature. In the temperature range, the average crystal grain diameter is not more than 1.0 μm and the strength of the substrate can be maintained extremely high. However, if the heat treating temperature exceeds 950° C., crystal phases are not largely changed but the average crystal grain diameter is increased to exceed 1.0 μm so that a tendency was observed of decreasing the strength of the substrate. The inventors have found that a problem is arises in the substrate of the present invention if the β-spodumene phase is excessively increased as compared with the original lithium disilicate phase. That is, the mechanical strength of the substrate was decreased if the formation of the crystal grains of the β-spodumene phase is so progressed to decrease the weight ratio of the lithium disilicate phase/(the total amount of the β-spodumene phase plus β-spodumene solid solution) to less than 1.0.

From the above reason, it was found that the above described weight ratio should preferably be not less than 1.0. It was also found that a more preferable mechanical strength of the substrate can be obtained if the above described weight ratio is not less than 1.3.

If the $Al_2O_3$ component in the raw glass exceeds 8 wt %, the crystal grains of the β-spodumene phase is so excessively formed that the strength of the substrate was decreased. Therefore, the amount of the $Al_2O_3$ component in the raw glass should not exceed 8 wt %.

When heating the raw glass in the above producing method, preferably a temperature raising rate of 50°–300° C./hr is maintained in a temperature region of at least 500° C. to proceed with the formation of the crystal nuclei. Also, the heating is preferably effected in a temperature range of at least 500°–580° C. for 1–4 hrs to proceed the formation of the crystal nuclei.

Components other than those described above may be contained in the glass ceramic used for the substrate. For example, as a nucleating agent other than the $P_2O_5$, a metal oxide, such as, $TiO_2$, $ZrO_2$ or $SnO_2$ or a metal, such as, platinum, or a metal fluoride may be used alone or in admixture of at least two.

$K_2O$ may be contained in the glass ceramic in an amount of 0–7 wt %. This component has effects of lowering the melting and forming temperature of the glass and preventing the devitrification of the glass at the time of forming the glass. In order to exhibit such functions, the glass preferably contain not less than 2 wt % of the $K_2O$ component. If the content of the $K_2O$ component exceeds 7 wt %, the strength of the glass ceramic tends to decrease.

Either one of $As_2O_3$ and $Sb_2O_3$ or the both may be contained in the glass ceramic in a total amount of 0–2 wt %. These components serve as a clarifier in melting the glass.

In addition, 0–3 wt % of $B_2O_3$ component, 0–3 wt % of CaO component, 0–3 wt % of SrO component and 0–3 wt % of BaO component may be contained in the glass ceramic. Preferably, MgO component is substantially not contained in the glass ceramics.

In producing the raw glass, raw materials containing the above components are mixed to give the afore-described weight ratio and the mixture is melted by heating. As such raw materials, oxides, carbonates, nitrates, phosphates and hydroxides of the respective metal atoms may be exemplified. As the atmosphere of heat treating the raw glass and crystallizing the glass, aerial atmosphere or an inert atmosphere, etc. may be selected.

The optical fiber-fixing substrate made of the material is similarly applicable to the optical fiber-fixing substrate of a different form from the afore-described optical fiber-fixing substrates explained with reference to FIGS. 2–6.

The inventors have found that the following (1)–(4) materials are particularly superior as the material for constituting the optical fiber.

(1) BK-7 optical glass

This glass has a high ultra violet ray (UV ray) permeating property and a coefficient of thermal expansion (CTE) of around $70 \times 10^{-7}/°C.$, so that the glass can minimize the difference of thermal expansion between the optical fiber and the optical guide wave on the substrate made of $LiNbO_3$. If the glass is used for fixing a ball lens or the like BK-7 article, the glass is most satisfactory because the glass is made of the same material as the BK-7 article. When the optical fiber and the optical fiber-fixing substrate are adhered to each other by means of an UV ray-curable resin adhesive after the optical coupling thereof, the material of the optical fiber-fixing substrate is requested to have a high UV ray permeability. For that purpose, the BK-7 glass is quite suitable because it has a high permeability of not less than 90% at the wave length of λ=360 nm.

When the optical fiber-fixing substrate is coupled to an X-cut $LiNbO_3$ optical guide wave, the substrate having the X-cut $LiNbO_3$ optical guide wave has a CTE of $150 \times 10^{-7}/$°C. in one direction and a CTE of $40 \times 10^{-7}/°C.$ in another direction. Therefore, if the matching of the CTEs of the two directions is considered, the material constituting the optical fiber-fixing substrate should preferably have a CTE of $85 \times 10^{-7}/°C.$ The BK-7 glass has such a level of CTE.

Usually, the BK-7 glass is used as the material of ball lenses etc. and the use of the BK-7 glass as the material of the optical fiber-fixing substrate removes the difference of CTE between the ball lenses etc. and the optical fiber-fixing substrate.

(2) Borosilicate glass

Borosilicate glass has a low CTE of $\alpha = 32 \times 10^{-7}/°C.$ which is a very low CTE among the usually commercially available glasses. This glass can produce the optical fiber-fixing substrate of a low expansion without performing the crystallization treatment etc. Also, this glass allows the use of the UV ray-curable resin in the similar manner as described above in that it has a high UV ray permeability.

(3) Soda lime glass

Soda lime glass, if impregnated in a $KNO_3$ solution at 480° C., can achieve an improved strength by ion exchange of $Na^+$ with $K^+$ in a range of 30 μm from the surface.

(4) Ion exchanged glass

If the optical fiber-fixing substrate using this material is used, an optical waveguide can directly be formed on the substrate to allow direct coupling of the optical waveguide to the optical fiber.

Hereinafter, more concrete experimental results will be explained. According to the aforedescribed method the optical fiber-fixing substrate 1 shown in FIG. 2 and the optical fiber-fixing substrate 45 shown in FIG. 6 were produced by the press forming method. However, an alumina powder of a purity of 99.8% was used as the raw material which was added with 3% of polyvinyl alcohol (PVA) and 1% of polyethylene glycol (PEG) as a binder and granulated by a spray dryer to obtain the material for forming.

Meanwhile, a mold 37 of a shape shown in FIG. 4 was prepared. At that time, the mold 37 was prepared from a super hard alloy and ground at the surface by a diamond grinding wheel to form the respective fixing groove 38. The material for forming was filled between the mold 37 and the lower mold of a planar shape and press formed under a pressure of 2,000 kg/cm². The thus obtained shaped body was fired in an oxidizing atmosphere at 1,600° C. to produce an optical fiber-fixing substrate. An optical fiber was received in the respective fixing groove of the substrate and contacted strongly to the ridges of the fixing groove. Afterwards, the neighbor-hood of the fixing groove was observed.

Figure 19:
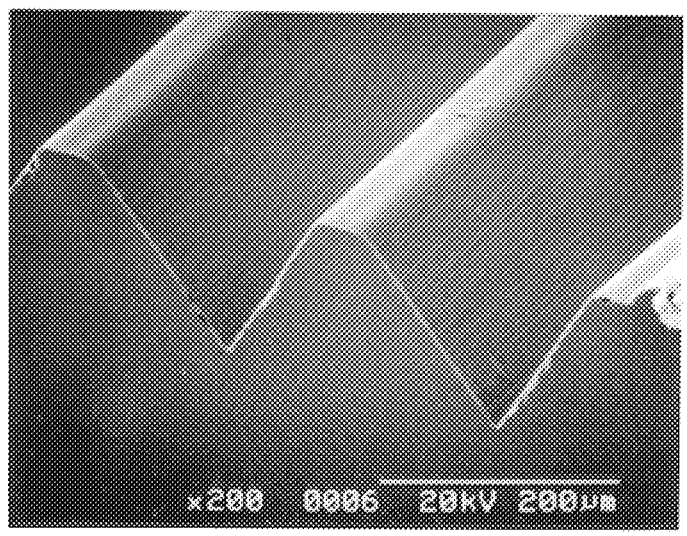
FIG. 19 is a photograph taken by a survey type electron microscope showing the neighborhood of the fixing groove of the substrate 45 of FIG. 6.

FIG. 19 is a photograph of the neighborhood of the fixing groove 3 of the optical fiber-fixing substrate 5 shown in FIG. 6. As clearly apparent, the ridges of the fixing grooves are round and the bottoms are very sharp. The respective ridge existing between the fixing grooves did not have a particular defect or fragmented portion. The similar results were obtained regarding the optical fiber-fixing substrate 1 shown in FIG. 2.

In the meantime, the above material for forming was formed to obtain a formed body of a planar shape which was then fired in an oxidizing atmosphere at 1,600° C. to produce an optical fiber-fixing substrate main body of a planar shape. A surface of the substrate main body was ground by a diamond grinding wheel to obtain the substrate 8 shown in FIG. 3. An optical fiber was received in the respective fixing groove 12 of the substrate 8 and contacted strongly to the ridges of the fixing groove 12. Afterwards, the neighborhood of the fixing groove was observed.

Figure 20:
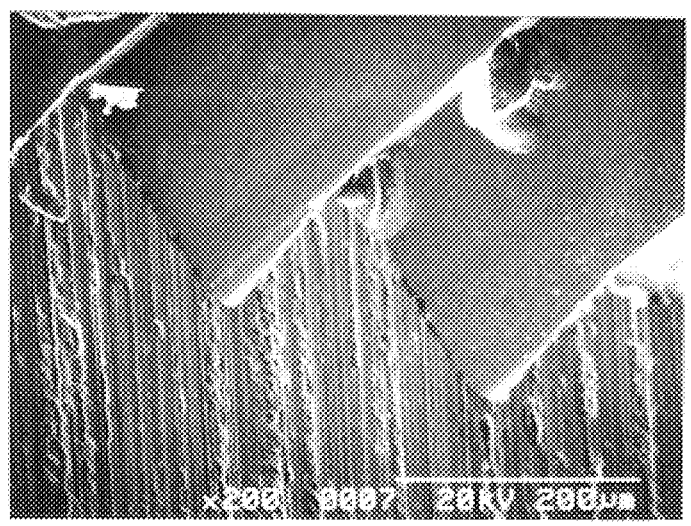
FIG. 20 is a photograph taken by a survey type electron microscope showing the neighborhood of the fixing groove of the substrate 8 of FIG. 3.

As a result, fragmented portions as shown in FIG. 20 were observed at some portions of the substrate. As clearly apparent, the ridges of the fixing grooves are very sharp and the bottoms are round. It is noted that the fragmented portions are formed extending from the top of the ridges towards the bottom of the fixing grooves. This is presumably considered that the fragmented portions or cracks where began from around the top portion of the ridges.

$Li_2O—Al_2O_3—SiO_2$ series glasses were press formed using the above mold and the shaped bodies were crystallized by the heat treatment to produce the substrates 1, 45 shown in FIGS. 2, 6. The substrates were observed in the same manner as described above to obtain the same results as described above.

As explained in detail in the foregoing, the present invention can prevent the formation of the defect or break-off of the ridges of the fixing grooves when the optical fibers are received in the fixing grooves of the optical fiber-fixing substrates or when the end surfaces of the substrates are polished by grinding.

Though the present invention has been explained in detail with specific values and embodiments, it is of course apparent to those skilled in the art that various changes and modifications are possible without departing from the broad spirit and aspect of the present invention as defined in the appended claims.

What is claimed is:

1. An optical fiber-fixing substrate comprised of glass or ceramic and including a fixing groove formed therein for receiving and positioning an optical fiber, said fixing groove including ridges having a radius of curvature of not less than 5 μm as viewed in a lateral cross-section of the fixing groove.

2. The optical fiber-fixing substrate of claim 1, wherein the bottom of the fixing groove has a radius of curvature of not more than 5 μm viewed in the lateral cross-section of the fixing groove.

3. The optical fiber-fixing substrate of claim 1, wherein the substrate is formed by press forming.

4. A method of producing an optical fiber-fixing substrate having a fixing groove formed therein for receiving and positioning an optical fiber, comprising:

preparing a mold having a complementary shape which corresponds to the optical fiber fixing substrate, the mold including a groove prepared by grinding, and using the mold to press form material to form the substrate.

5. A method of producing an optical fiber-fixing substrate having a fixing groove formed therein for receiving and positioning an optical fiber, comprising:

forming a fixing groove in the substrate defined by opposing ridges, and polishing the ridges by grinding such that the ridges of the fixing groove have a radius of curvature of not less than 5 μm viewed in a lateral cross-section of the fixing groove.

6. An optical fiber-fixing substrate comprised of glass or ceramic and having a fixing groove extending along a main surface of the substrate, for receiving and positioning an optical fiber, wherein the fixing groove curves along the main surface, in the plane of the main surface.

7. The optical fiber-fixing substrate of claim 6, wherein the fixing groove has inclined side surfaces, and an optical fiber having the same planar shape as the fixing groove is received and fixed in the fixing groove such that stresses exerted by the inclined surfaces of the fixing groove on the optical fiber are minimized.

8. The optical fiber-fixing substrate of claim 6, wherein the substrate is produced by a press-forming method such that the fixing groove is accurately formed.

9. An optical fiber-fixing substrate having a main surface, first and second opposite sides, and a fixing groove, for receiving and positioning an optical fiber, extending along the main surface from said first side toward said second side and terminating before reaching the second side, thereby defining an end surface of the fixing groove, said end surface being vertical to the main surface of the substrate.

10. An optical fiber-fixing substrate, comprising a main surface and a fixing groove extending along the main surface for receiving and positioning an optical fiber, the fixing groove having at least a first portion having a first cross-sectional area and a second portion having a second cross-sectional area, the first cross-sectional area being greater than the second cross-sectional area, the first portion terminating at an end surface that extends vertical to the main surface of the substrate between the first and second portions.

11. An optical fiber-fixing substrate, comprising a connecting portion having a base surface, a first protruding portion extending above the base surface, and a second protruding portion extending above the base surface, the first and second protruding portions including first and second fixing grooves, respectively, the first fixing groove being positioned at a higher height from the base surface than a height of the second fixing groove from the base surface.

12. an optical fiber-fixing substrate formed by press forming, the substrate having a fixing groove formed therein for receiving and positioning an optical fiber, the substrate being comprised of a glass ceramic, the glass ceramic having an average crystal grain diameter of not more than 1.0 μm, and being mainly composed of a lithium disilicate ($Li_2O.2SiO_2$) phase and β-spodumene ($Li_2O.Al_2O_3.4SiO_2$) and/or β-spodumene solid solution phases, wherein the substrate contains not more than 2 wt % of an $SiO_2$ crystal phase.

* * * * *